US008839347B2

(12) United States Patent
Boldyrev et al.

(10) Patent No.: US 8,839,347 B2
(45) Date of Patent: Sep. 16, 2014

(54) METHOD AND APPARATUS FOR PROVIDING PRIVACY IN COGNITIVE RADIO INFORMATION SHARING

(75) Inventors: Sergey Boldyrev, Söderkulla (FI); Jari-Jukka Harald Kaaja, Järvenpää (FI); Ian Justin Oliver, Söderkulla (FI); Mikko Aleksi Uusitalo, Helsinki (FI)

(73) Assignee: Nokia Corporation, Espoo (FI)

( * ) Notice: Subject to any disclaimer, the term of this patent is extended or adjusted under 35 U.S.C. 154(b) by 232 days.

(21) Appl. No.: 13/149,362

(22) Filed: May 31, 2011

(65) Prior Publication Data

US 2012/0311657 A1 Dec. 6, 2012

(51) Int. Cl.
G06F 17/00 (2006.01)
H04L 29/06 (2006.01)
H04H 40/00 (2008.01)

(52) U.S. Cl.
USPC ............... 726/1; 455/454; 455/509; 455/514

(58) Field of Classification Search
USPC .............................. 726/1; 455/454, 509, 514
See application file for complete search history.

(56) References Cited

U.S. PATENT DOCUMENTS

| 8,310,991 B2* | 11/2012 | Kasslin et al. ................ 370/328 |
| 2009/0124207 A1 | 5/2009 | Mody et al. |
| 2009/0124208 A1* | 5/2009 | Mody et al. ................ 455/67.11 |
| 2010/0069013 A1* | 3/2010 | Chaudhri et al. .......... 455/67.11 |
| 2010/0238798 A1* | 9/2010 | Ahuja et al. ................ 370/225 |
| 2011/0123028 A1 | 5/2011 | Karabinis |
| 2011/0138183 A1* | 6/2011 | Reddy et al. ................ 713/169 |
| 2011/0319114 A1 | 12/2011 | Tavildar et al. |
| 2012/0165056 A1* | 6/2012 | Kim et al. ..................... 455/509 |

FOREIGN PATENT DOCUMENTS

WO WO 2009/110969 A2 9/2009

OTHER PUBLICATIONS

Akyildiz, Ian F. et al. "Cooperative spectrum sensing in cognitive radio networks: A survey", 2010.*
Brown, Timothy X. et al. "Potential Cognitive Radio Denial-of-Service Vulnerabilities and Protection Countermeasures: A multi-dimensional Analysis and Assessment", 2008.*
Burbank, Jack L. "Security in Cognitive Radio Networks: The Required Evolution in Approaches to Wireless Network Security", 2008.*
Ersoz, Seda Dmirag et al. "Secure Spectrum Sensing and Decision in Cognitive Radio Networks", Jun. 2010.*

(Continued)

*Primary Examiner* — Michael Simitoski
(74) *Attorney, Agent, or Firm* — Ditthavong & Steiner, P.C.

(57) ABSTRACT

An approach is provided for providing privacy in cognitive radio information sharing. A cognitive radio privacy platform receives a request, from a device, for performing one or more operations on cognitive radio information stored in at least one information space. The cognitive radio privacy platform also determines one or more privacy policies associated with the device, the one or more operations, the cognitive radio information, the at least one information space, or a combination thereof. The cognitive radio privacy platform further processes and/or facilitates a processing of the one or more privacy policies to determine an availability, a restriction, or a combination thereof of the cognitive radio information. The cognitive radio privacy platform also causes, at least in part, the performing of the one or more operations based, at least in part, on the availability, the restriction, or a combination thereof of the cognitive radio information.

20 Claims, 15 Drawing Sheets

(56) References Cited

OTHER PUBLICATIONS

Kim, Hyun Sung. "Location-based authentication protocol for first cognitive radio networking standard", 2010.*

Baykas, et al., "System Design Document," Mar. 2010, IEEE P802. 19 Wireless Coexistence, pp. 1-15.

Junell, et al., "System description and reference model proposal," Sep. 2010, IEEE P802.19.Wireless Coexistence, pp. 1-23.

International Search Report for PCT/FI2012/050335 dated Aug. 10, 2012, pp. 1-4.

International Written Opinion for PCT.FI2012/050335 dated Aug. 10, 2012, pp. 1-7.

Office Action for related U.S. Appl. No. 13/075,723 dated Jul. 26, 2012, pp. 1-13.

Safdar et al., "Common Control Channel Security Framework for Cognitive Radio Networks", 2009 IEEE 69th Vehicular Technology Conference, Apr. 26-29, 2009, Barcelona, Spain, pp. 1-5.

Office Action for related U.S. Appl. No. 13/075,723 dated Dec. 20, 2012, pp. 1-13.

* cited by examiner

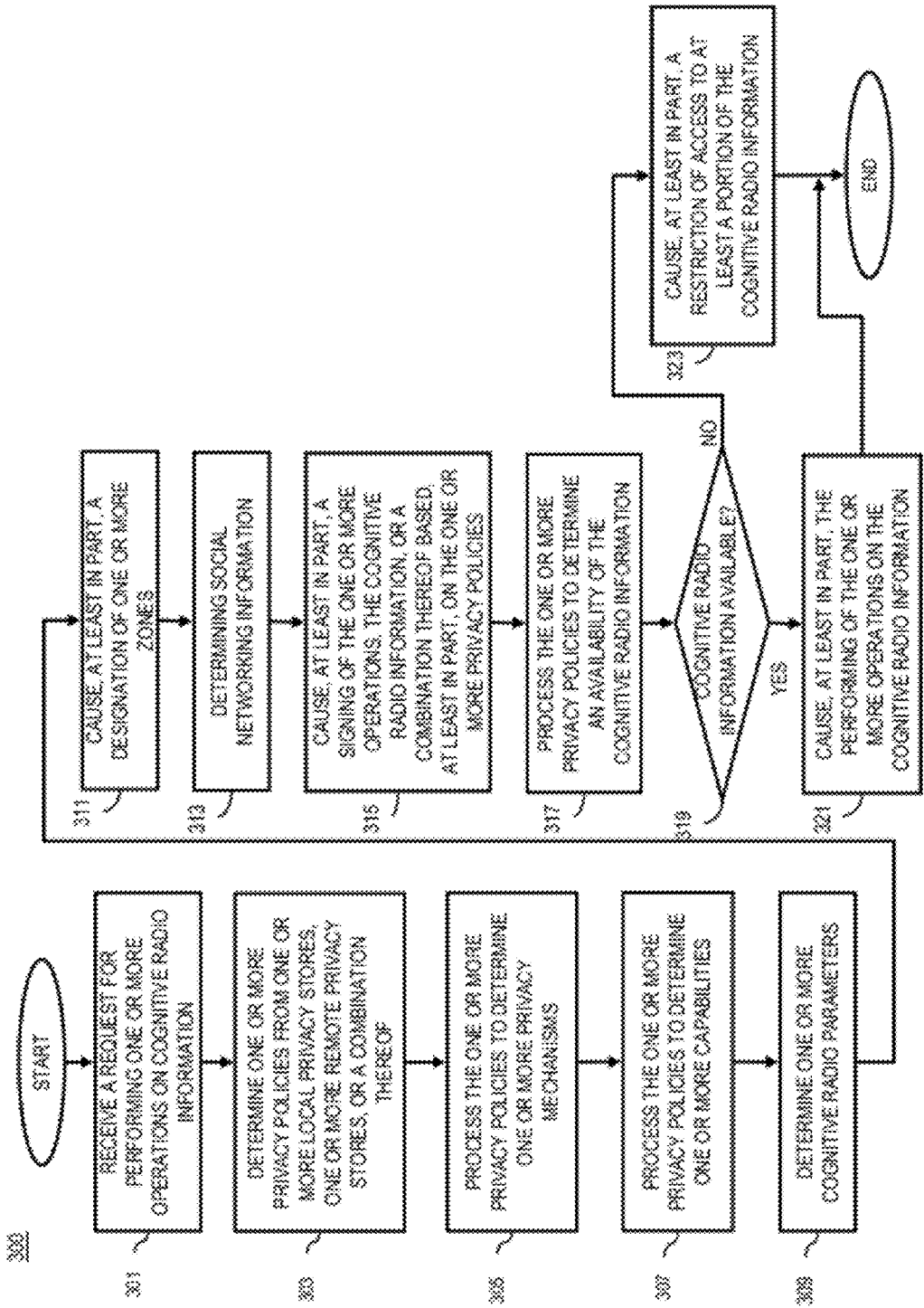

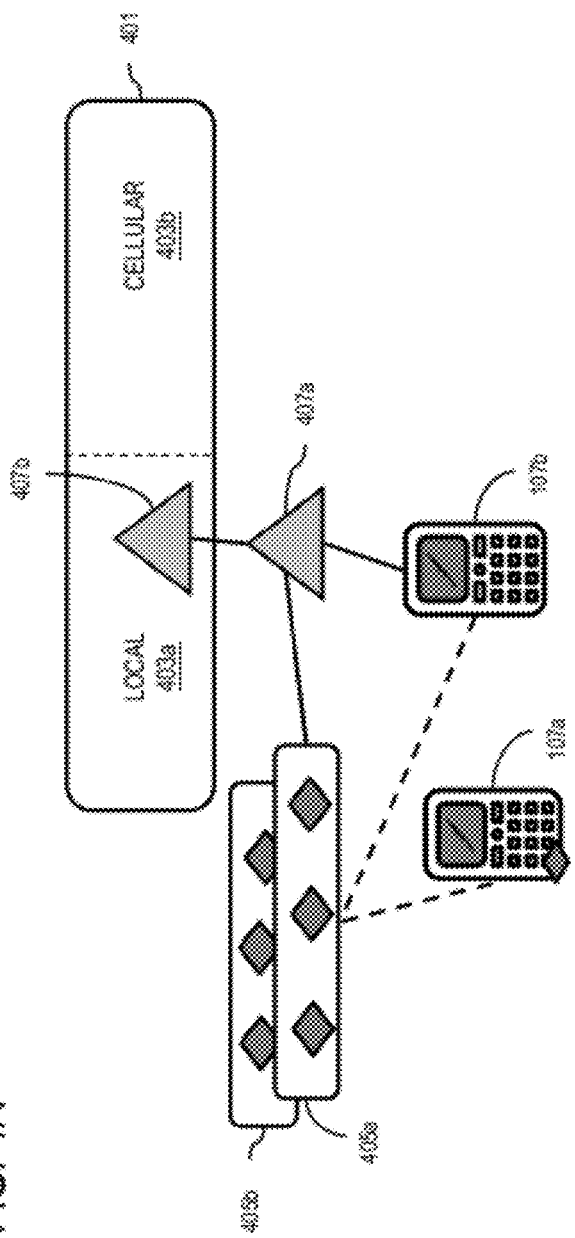
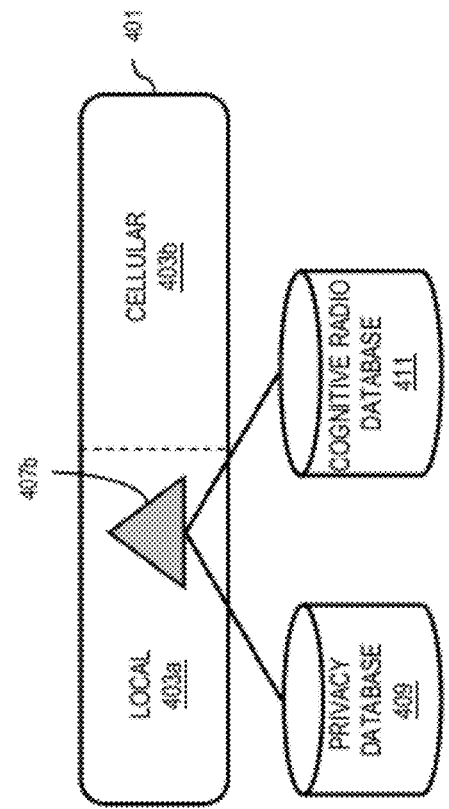

METHOD AND APPARATUS FOR PROVIDING PRIVACY IN COGNITIVE RADIO INFORMATION SHARING

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This can be achieved through numerous, individual and personal information spaces in which persons, groups of persons, etc. can place, share, interact and manipulate (or program devices to automatically perform the planning, interaction and manipulation of) webs of information with their own locally agreed semantics without necessarily conforming to an unobtainable, global whole.

Furthermore, in addition to information, the information spaces may be combined with webs of shared and interactive computations or computation spaces so that the devices having connectivity to the computation spaces can have the information in the information space manipulated within the computation space environment and the results delivered to the device, rather than the whole process being performed locally in the device. It is noted that such computation spaces may consist of connectivity between devices, from devices to network infrastructure, to distributed information spaces so that computations can be executed where enough computational elements are available. These combined information spaces and computation spaces often referred to as computation clouds, are extensions of the 'Giant Global Graph' in which one can apply semantics and reasoning at a local level.

Networks composed of mobile and immobile devices associated with the wide spectrum of distributed information and computation spaces communicate with each other via methods of connectivity based on various paradigms of communication (or radio) such as, for example, cognitive radio wave, telephony, fiber optics, orbiting satellites, the Internet, etc. A recent development in radio communication technology referred to as "cognitive radio" provides a paradigm for wireless communication in which either a network or a wireless node changes its transmission or reception parameters to communicate efficiently while avoiding interference with other users, either licensed or unlicensed. In one embodiment, this alteration of parameters is based, at least in part, on the active monitoring of several factors in the external and internal radio environment, such as radio frequency spectrum, user behavior and network state. By way of example, cognitive radio can provide many advantages over traditional radio communication paradigms, for example, by (1) enabling use of all available frequencies leading to efficient use of the radio spectrum, (2) providing each user with the optimal connectivity for the use and the occasion, (3) providing easy access control and identification management, (4) providing new levels of interaction among various radio types, etc. Because of the benefits of cognitive radio, many network managers may opt for using cognitive radio as their preferred way of communication. However, in order to be able to benefit from the advantages of cognitive radio, the users may need to share information about themselves with radio management systems so that the management systems can match user needs with available connectivity. On the other hand, the radio management systems may need to exchange user information with other local or global databases. As a result, user information may be shared and distributed in a wide network of service providers.

SOME EXAMPLE EMBODIMENTS

Therefore, there is a need for an approach for providing privacy in cognitive radio information sharing.

According to one embodiment, a method comprises receiving a request, from a device, for performing one or more operations on cognitive radio information stored in at least one information space. The method also comprises determining one or more privacy policies associated with the device, the one or more operations, the cognitive radio information, the at least one information space, or a combination thereof. The method further comprises processing and/or facilitating a processing of the one or more privacy policies to determine an availability, a restriction, or a combination thereof of the cognitive radio information. The method also comprises causing, at least in part, the performing of the one or more operations based, at least in part, on the availability, the restriction, or a combination thereof of the cognitive radio information.

According to another embodiment, an apparatus comprises at least one processor, and at least one memory including computer program code, the at least one memory and the computer program code configured to, with the at least one processor, cause, at least in part, the apparatus to receive a request, from a device, for performing one or more operations on cognitive radio information stored in at least one information space. The apparatus is also caused to determine one or more privacy policies associated with the device, the one or more operations, the cognitive radio information, the at least one information space, a cognitive radio infrastructure, a cloud computing element, or a combination thereof. The apparatus is further caused to process and/or facilitate a processing of the one or more privacy policies to determine an availability, a restriction, or a combination thereof of the cognitive radio information. The apparatus is also caused to cause, at least in part, the performing of the one or more operations based, at least in part, on the availability, the restriction, or a combination thereof of the cognitive radio information.

According to another embodiment, a computer-readable storage medium carries one or more sequences of one or more instructions which, when executed by one or more processors, cause, at least in part, an apparatus to receive a request, from a device, for performing one or more operations on cognitive radio information stored in at least one information space. The apparatus is also caused to determine one or more privacy policies associated with the device, the one or more operations, the cognitive radio information, the at least one information space, a cognitive radio infrastructure, a cloud computing element, or a combination thereof. The apparatus is further caused to process and/or facilitate a processing of the one or more privacy policies to determine an availability, a restriction, or a combination thereof of the cognitive radio information. The apparatus is also caused to cause, at least in part, the performing of the one or more operations based, at least in part, on the availability, a restriction, or a combination thereof of the cognitive radio information According to another embodiment, an apparatus comprises means for receiving a request, from a device, for performing one or more operations on cognitive radio information stored in at least one information space. The apparatus also comprises means for determining one or more privacy policies associated with the device, the one or more operations, the cognitive radio information, the at least one information space, a cognitive radio infrastructure, a cloud computing element, or a combination thereof. The apparatus further comprises means for processing and/or facilitating a processing of the one or more privacy policies to determine an availability, a restriction, or a combination thereof of the cognitive radio information. The apparatus also comprises means for causing, at least in part, the performing of the one or more operations based, at least in part, on the availability, a restriction, or a combination thereof of the cognitive radio information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for providing privacy in cognitive radio information sharing, according to one embodiment;

FIGS. 4A-4B are diagrams of cognitive radio privacy infrastructure, according to various embodiments;

DESCRIPTION OF SOME EMBODIMENTS

Examples of a method, apparatus, and computer program for providing privacy in cognitive radio information sharing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
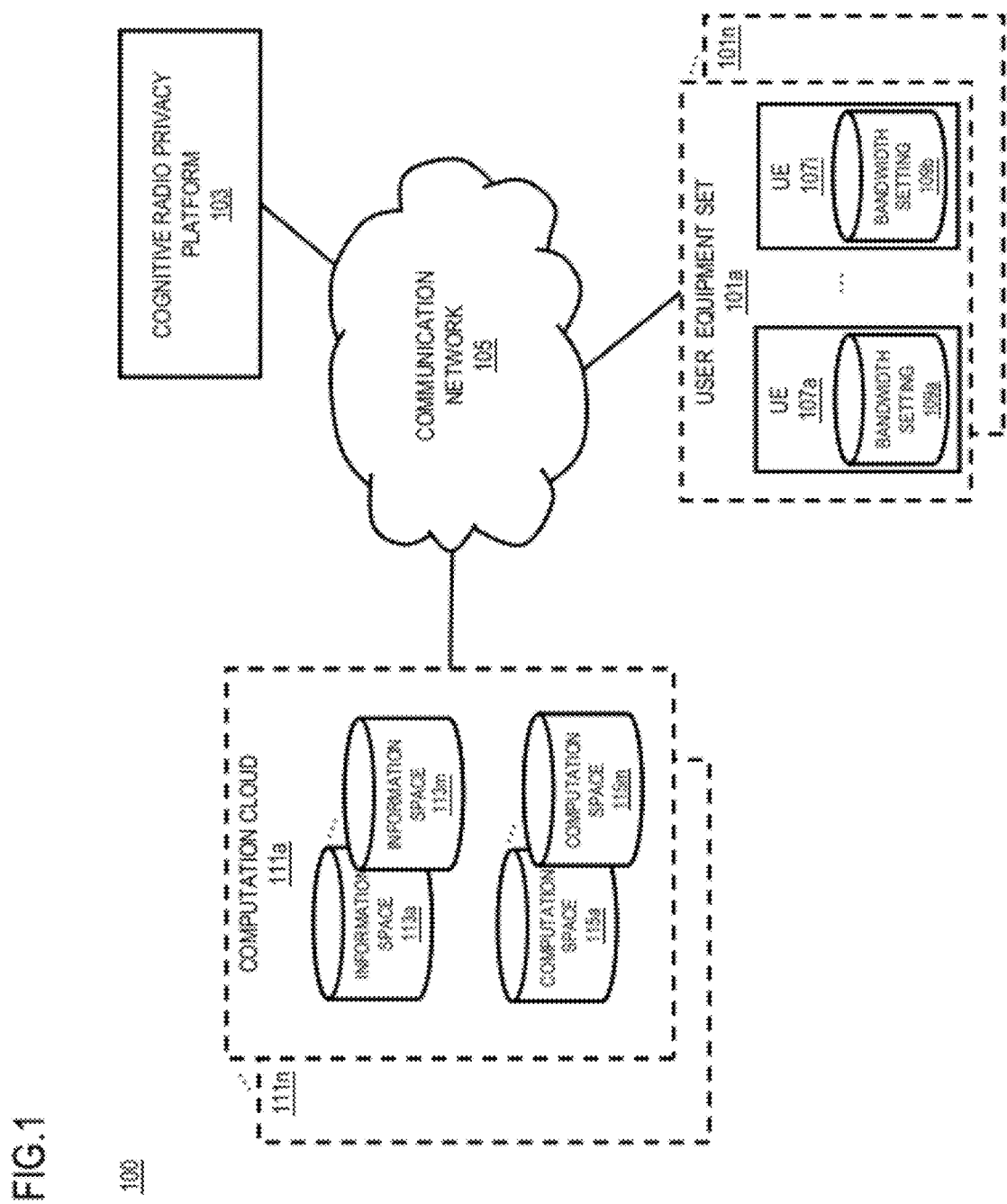
FIG. 1 is a diagram of a system capable of providing privacy in cognitive radio information sharing, according to one embodiment.

FIG. 1 is a diagram of a system capable of providing privacy in cognitive radio information sharing, according to one embodiment. Under traditional radio communication protocols, mobile devices generally are limited to using certain frequencies for communication which may cause high network traffic. For example, new music and video services on the Internet may require far more bandwidth than is available on the networks. As noted above, cognitive radio technology can be used to overcome some of the limitations of traditional wireless communications. For example, cognitive radio enables the devices to use all available frequencies even those dedicated to special services such as, for example, television (TV), satellites, etc. to support communications. More specifically, cognitive radio devices typically determine locally available radio spectrum and then negotiate with each other and/or with network management components in order to use the available radio spectrum in the most efficient way.

In one embodiment, cognitive radio may provide the possibility to multiply the current network speeds and/or capacity. For example, cognitive radio technology can be configured to understand the language of any radio protocol. This characteristic of the cognitive radio, combined with new simple radios embedded in any object, can provide interaction between any physical objects. This can also provide solutions for communication between people using communication devices with different setups, such as for example, different languages and cultures, etc.

For example, at a big event such as a concert or a sports event the local network may get overloaded. Based on the current spectrum usage limitations, the provided capacity may not be enough for all the users. In one embodiment, cognitive radio technology can use all available frequencies and connectivity methods. It can quickly adapt to the unusual situation and ensure proper operation of the networks. The devices can connect not only through the network cells, but also by forming spontaneous networks. This enables many more users to transmit information such as, for example, messages, phone calls, real time video streams, etc.

Furthermore, the cognitive connectivity and radio communication paradigm generally provides and/or relies on location dependent information on available bandwidth, rules, and tuning setups associated with a communication network. Accordingly, a cognitive radio enabled system often is equipped with one or more centralized databases in addition to local coexistence management for every device to interact and request operational parameters. More specifically, cognitive radio enabled devices can request and/or inform their (spectrum) findings to the cognitive radio database and local coexistence management, and in return receive settings and other response information to configure devices and utilize settings correctly at certain locations, which are under certain regulations. These interactions often involve sharing and/or distributing cognitive radio information among participating devices. In addition, a cognitive enabled device should provide information to the coexistence manager in order for the coexistence manager to be able to provide a proper type of available connectivity to the device using the provided information. The coexistence manager may also exchange the information regarding individual devices with other (e.g., global) databases. Therefore, there is a need for an approach for enforcing privacy on the shared information in a cognitive radio connectivity environment.

To address this problem, a system 100 of FIG. 1 introduces the capability to provide privacy in cognitive radio information sharing.

The cloud computing environments provide aggregated sets of information (information spaces) and computations (computation spaces) from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats.

The basic concept of information space technology provides access to distributed information for various devices within the scope of the cloud, in such a way that the distributed nature of the information is hidden from users and it appears to a user as if all the information exist on the same device. The information spaces also enable a user to have control over information distribution by transferring information between devices that the user has access to. For example, a user may want to transfer information among work devices, home devices, and portable devices, other private and public devices, etc. Furthermore, as computing environments become more and more personalized as well as localized, the need for more sophisticated sharing mechanisms between information spaces increases. For example, users may tend to own more than one mobile devices and using them for various purposes such as, a work phone, a personal phone, a media player, a browser, etc. These sharing mechanisms while at the outset appear to be simple union and partitioning of the information proved more difficult because of the internal interactions of the information and the semantic structures governing that information. For example, operations such as split (dividing an information space into two or more smaller information spaces), merge (joining two or more information spaces into larger information spaces), projection (extracting information from an information space), injection (adding information to an existing information space), etc. facilitate sharing information among devices.

In one embodiment, cognitive radio enabled communication networks interact with the information spaces of a cloud environment, create mappings between related architectures, find commonalities in order to determine how cognitive radio can fit into wireless mobile environments (e.g., via platform application programming interfaces (APIs) such as core APIs and/or mobile functionality specific APIs, wherein platform APIs add mobile device features to the standard application development platforms).

In one embodiment, a distributed information space is constituted by different namespaces, wherein a namespace is an abstract environment holding logical groupings of unique identifiers associated with the information space content. In this embodiment, the information associated with cognitive radio (e.g. cognitive radio parameters) may be stored in different namespaces associated with distributed information spaces and the namespaces within the distributed information spaces are accessible to one or more cognitive radio enabled devices so that the cognitive radio enabled devices can use the stored parameters for communication within the wireless environment.

In one embodiment, integrated services and architectures enable the cognitive radio communication networks and other systems such as distributed information spaces and communication spaces in a cloud environment to communicate with each other via a common language. In this way, information spaces or cloud entities can be considered as aggregated information sets from different sources. In one embodiment, this multi-sourcing provides considerable flexibility by enabling the same piece of information to come from different sources.

It is noted that cognitive radio may use any available radio spectrum. For example, in the United States, cognitive radio devices include TV band devices (TVBDs) that can use available TV white space spectrum (or the unused TV spectrum)

for communications. To facilitate such use, a cognitive radio database can be created to record uses or applications of the TV white space to ensure that cognitive radio uses do not interfere with other uses of the same radio frequencies (e.g., for TV broadcasts, etc.) In other words, the application of cognitive radio technology to white spaces may provide intelligent combination of the white spaces with other licensed and unlicensed bands to increase total system capacity and reliability. However, since a cognitive radio database may contain sensitive and private information, ensuring the privacy of the database content and prevention of unauthorized access to the information is an important issue. In order to provide efficiency, flexibility and scalability to the users, a cognitive radio system should also provide privacy services and integrate privacy enabler and filtering architectures to offer cognitive connectivity with other existing systems. Additionally, privacy functionality should be integrated into the cognitive radio database, into different places in the cognitive radio TV white space, other local domain systems, Radio Frequency (RF) memory tag systems, or a combination thereof.

In one embodiment, a device can access the cognitive connectivity white space database architecture and other cognitive connectivity information via the distributed information spaces and communication spaces in a cloud environment. Therefore, cloud environment as a communication standard can be also utilized for exchange of cognitive connectivity information among devices.

In one embodiment, the cognitive connectivity and radio provide location dependent information on available bandwidth, rules, and tuning setup. Cognitive radio has access to centralized databases and local coexistence management for every device to interact and request operational parameters. However, certain information may be more sensitive (e.g. with privacy aspects assigned). When exchanging such private information to devices, a privacy enabler functions as a gatekeeper between the information requesting component and other components of the cognitive radio environment and filters the sensitive information. Additionally, there can exist privacy databases, accessible via the cloud, which control privacy in environments such as social networks, etc. The privacy control can be done based on requester's ID, credentials and location data, etc.

As shown in FIG. 1, the system 100 comprises sets 101a-101n of user equipments (UEs) 107a-107i having connectivity to the cognitive radio privacy platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 107a-107i can support any type of interface to the user (such as "wearable" circuitry, etc.).

In one embodiment, the cognitive radio privacy platform 103 controls the one or more central databases associated with the cognitive radio information, which may need secure privacy and privacy enabling systems. Additionally, cloud environment (or element of the cloud computing environment) is capable of communicating with the cognitive radio under the control of the cognitive radio privacy platform 103 (e.g., a regional cognitive radio infrastructure) and therefore seamless privacy enforcement in cognitive radio communication can be provided. Furthermore, the cognitive radio architecture can be extended to use the policy ontology associated with the communication network, while taking into account essential cognitive radio capabilities and which can provide additions to the policy language. On the other hand, cloud privacy ontology can be extended to accommodate privacy requirements of the cognitive radio and other local environments.

It is noted that in order to enforce privacy, the user or the information requesting agent should be identified. Typically, the requesting agent can be identified as a person or an entity who is logged into the system with identifiers such as user name, etc. The identifier is used by the privacy enabler to select the policies in much the same way as access control would work. This identifier can be a large structure containing other credentials, security keys, location, actual identity of the user, identity of the device, etc.

In one embodiment, the identity of an information requester (e.g. a user) may be validated via a social network (e.g. a friend) for example another user can validate that the information requesting user is a friend and therefore is allowed to receive less filtered data. In other embodiments, privacy may be globally enforced. The privacy regulation can be parameterized over a user ID, a device ID or location ID., etc. Furthermore, privacy policies can be developed by any entity within an end-to-end environment, for example, system operators, government, trusted third parties, etc.

In one embodiment, the privacy of the information in a cognitive radio information sharing environment can be provided in an ad-hoc mesh network. An ad-hoc mesh network is, for instance, a serverless device-to-device network (e.g., a mobile ad-hoc network (MANET)) created using short-range radio technology (e.g., wireless local area network (WLAN) or Bluetooth®). Alternatively, ad-hoc mesh networks may be created using close proximity radio technology for very short distances such as Radio Frequency Identification (RFID), Near Field Communication (NFC), RF memory tag systems, etc. A close proximity network can be part of a bigger ad-hoc mesh network, the last centimeter distances from cognitive mobile reader/writer device to the RF memory tag or other peer devices. Within the ad-hoc mesh network, each wireless device 107a-107i may be mobile and is within communication range of any number of other wireless devices 107a-107i. Accordingly, the set of wireless devices 107a-107i that is within communication range of any a particular wireless device 107 is transient and can change as the wireless devices 107a-107i move from location to location.

In one embodiment, policies (e.g. privacy policies) can be presented in a direct way, wherein the user of a user equipment (UE) 107a-107i can have direct control over policies using a User Interface (UI) on the UE 107a-107i (traditional approach). In other embodiments, the policies can be implicitly enforced behind the scene, wherein the UEs can interact implicitly, for example via a contact list.

In one embodiment, the privacy enabling is applied to cognitive radio specific systems architecture or infrastructure (e.g. white space), ad-hoc mesh networks, distributed information architectures (e.g. clouds), etc. The privacy enabler can utilize cognitive radio capabilities, which can provide additions to policy languages.

In one embodiment, the cognitive radio database can be integrated with privacy database (e.g. central database) which can control privacy of the cognitive radio database and access privacy to and/or from the database. Alternatively, the privacy database can be distributed with equivalent privacy enabler to cognitive radio white space architecture blocks and to different places in cognitive radio white space such as, for example, TV Band Devices (TVBD), Coexistence Enablers (CE), Coexistence Managers (CM), Coexistence Discovery and Information Servers (CDIS), remote CMs, etc.

In other embodiments, the cognitive radio spectrum and device settings can be locally put under selected privacy policies, cloud or ad-hoc mesh network environments can provide privacy enabler interaction means, and the combination of these privacy enforcements can provide agreed upon privacy enabler options for different ranges of local and distributed communications. As a result, a privacy hierarchy can be integrated into the cognitive radio system.

By way of example, the UEs 107a-107i, and the cognitive radio privacy platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
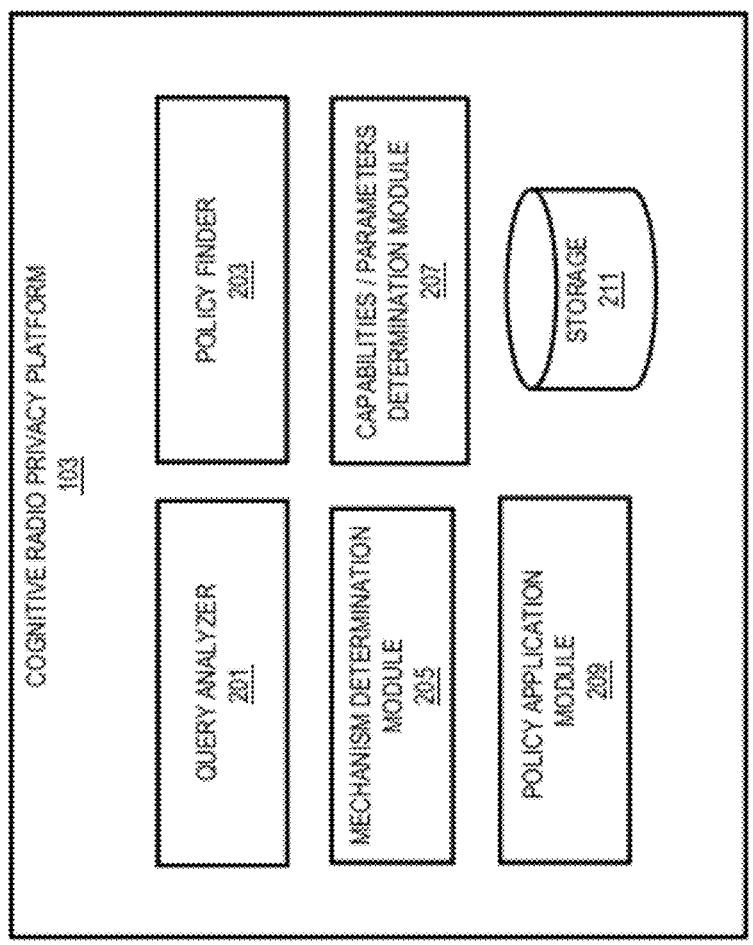
FIG. 2 is a diagram of the components of cognitive radio privacy platform, according to one embodiment.

FIG. 2 is a diagram of the components of a cognitive radio privacy platform, according to one embodiment. By way of example, the cognitive radio privacy platform 103 includes one or more components for providing privacy in cognitive radio information sharing. It is contemplated that the functions of these components may be combined in one or more components or performed by other components of equivalent functionality. In this embodiment, the cognitive radio privacy platform 103 includes a query analyzer 201, a policy finder 203, a mechanism determination module 205, a capabilities/parameters determination module 207, a policy application module 209, and a storage 211.

Figure 13:
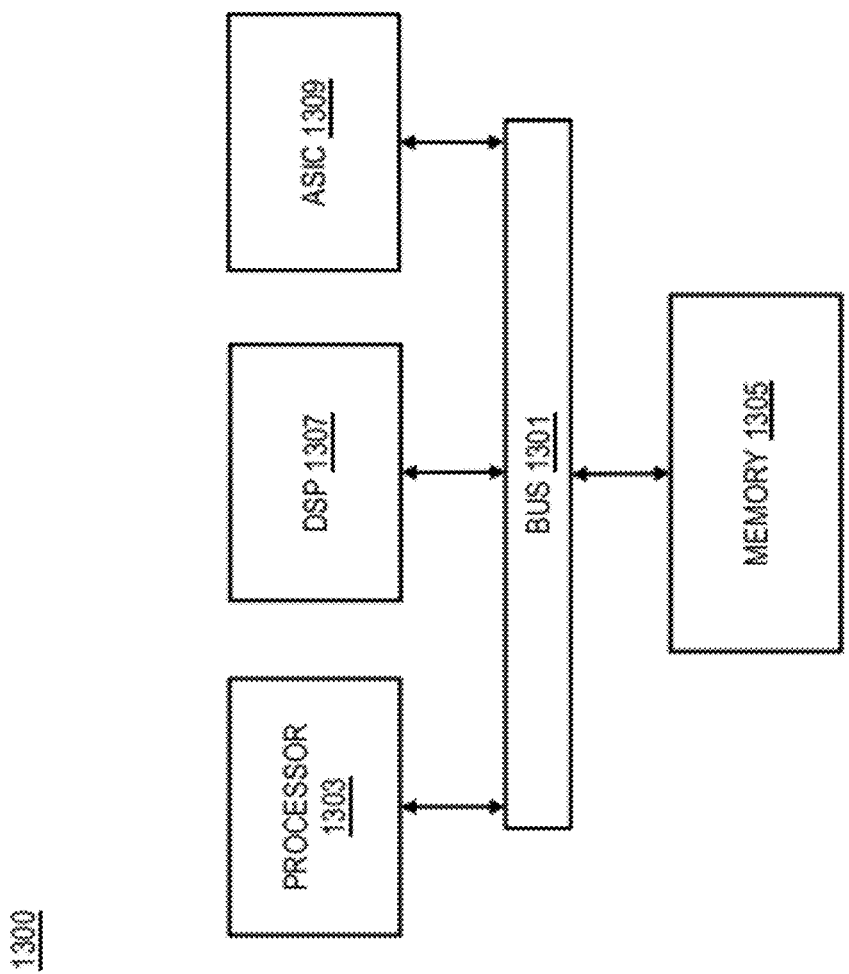
FIG. 13 is a diagram of a chip set that can be used to implement an embodiment of the invention.

FIG. 2 is described with reference to FIG. 3, wherein FIG. 3 shows a flowchart of a process for providing privacy in cognitive radio information sharing, according to one embodiment. In one embodiment, the cognitive radio privacy platform performs the process 300 and is implemented in, for instance, a chip set including a processor and a memory as shown in FIG. 13.

In one embodiment, per step 301 of flowchart 300 in FIG. 3, the cognitive radio privacy platform 103 receives a request, from a UE 107a-107i, for performing one or more operations on cognitive radio information stored in at least one information space 113a-113m (e.g. cognitive radio database). The query analyzer 201 analyzes the request for determining one or more elements of the cognitive radio data that the operation performance is requested for.

In one embodiment, per step 303 of FIG. 3, the policy finder 203 determines one or more privacy policies associated with entities such as the requesting UE 107a-107i, the one or more operations, the cognitive radio information, the at least one information space 113a-113m, a cognitive radio infrastructure (e.g., the cognitive radio privacy platform 103), a cloud computing environment or element, or a combination thereof. The policy finder 203 may check a privacy policy database, which can be stored in information spaces 113a-113m, in a storage 211, or a combination thereof, for privacy policies. The policy finder 203 may also determine the privacy policies from one or more local privacy stores, one or more remote privacy stores, or a combination thereof. It is noted that there can be a many to many relationship between the entities and privacy policies. This means that each policy may apply to one or more entities, while each entity may have one or more policies applied to it. If neither the privacy policy database nor the storage 211 contain any policies concerning some or all the entities, the absence of policies may be interpreted as an indication that there are no restriction on accessing the cognitive radio data by any user, device, etc. The storage 211 may be used as cache wherein the policy information extracted from the privacy policy database is temporarily stored (for example for a certain period of time) and any reference to those extracted policies during the certain period of time can be made via storage 211 without a need for accessing the privacy policy database, given that the content of the privacy policy database has not been modified since the last access or in other words the content of storage 211 is current and up to date. Following the extraction of policies related to the entities from the privacy policy database, the policy finder 203 may insert or update the content of the storage 211 accordingly.

In one embodiment, per step 305 of FIG. 3, the mechanism determination module 205 processes and/or facilitates a processing of the one or more privacy policies to determine one or more mechanisms for the enforcement of the one or more privacy policies. The mechanisms may include, at least in part, one or more encryption mechanisms, one or more filtering mechanisms, one or more anonymization mechanisms, or a combination thereof, wherein encryption method has a direct link to security capabilities of cognitive radio information. Filtering process may exclude some cognitive radio information from the set of information that is going to be accessed, in order to produce a new set that its privacy requirements would match with the privacy capabilities of the requesting environment. The anonymization process may make the cognitive radio information untraceable, for example by removing the sensitive information that may also reveal information ownerships. It is noted that various privacy policies belong to one or a combination of these main mechanisms. In one embodiment, the mechanism determination module 205 determines the one or more mechanisms based, at least in part, on the computational architecture. It is noted that various components and levels of the architecture may have different rules that require enforcement of specific mechanisms.

In one embodiment, per step 307 of FIG. 3, the capabilities/parameters determination module 207 processes and/or facilitates a processing of the one or more privacy policies to determine one or more capabilities of the UE 107*a*-107*i*, one or more other UEs 107*a*-107*i* sharing the cognitive radio information, or a combination thereof.

In one embodiment, per the capabilities/parameters determination module 207 processes and/or facilitates processing of the at least one accessed information spaces 113*a*-113*m* to determine one or more capabilities of the one or more cognitive radio enabled UEs 107*a*-107*i*, wherein an operation of at least one of the one or more cognitive radio enabled UEs 107*a*-107*i* is based, at least in part, on the one or more capabilities.

In one embodiment, the device capabilities/parameters determination module 207, verifies whether device capabilities may be extracted from any external data sources associated with clouds 111*a*-111*n*. For example, the capabilities of the cognitive radio enabled UEs 107*a*-107*i* may be extracted from the WURFL database, since the cognitive radio structure may utilize services provided by external sources, such as the Wireless Universal Resource File (WURFL). In this embodiment, the capabilities/parameters determination module 207 may extract information associated with cognitive radio capabilities of UEs 107*a*-107*i* from the WURFL, per step 307 of FIG. 3, and translate the extracted information into the cognitive radio specific expressions. Subsequently, the extracted capabilities may be stored in storage 211, in cloud 111*a*-111*n* or a combination thereof and utilized for the operation of UEs 107*a*-107*i* based on the cognitive radio paradigm.

In one embodiment, per step 309 of FIG. 3, the capabilities/parameters determination module 207 determines one or more cognitive radio parameters associated with the UE 107*a*-107*i*, the one or more other UEs 107*a*-107*i*, or a combination thereof. The cognitive radio parameters may include, at least in part, one or more locations, one or more regulations, one or more frequencies, or a combination thereof for communicating among one or more radio devices (e.g. UEs 107*a*-107*i*) at the one or more locations. The parameters may also include available bandwidth at each specific location, rules and regulations that govern bandwidth use by various devices (e.g. restrictions, usage plans, privileges, etc.) at the location, etc.

In one embodiment, the cognitive radio parameters may provide guidelines and methods for determining other cognitive radio parameters. For example, processing of the one or more cognitive radio parameters can determine a sniffing method, an interrogation method, or a combination thereof for determining one or more other cognitive radio parameters associated with the one or more locations, one or more other locations, or a combination thereof.

It is noted that sniffing (e.g. radio sensing) may include interception and logging of traffic passing over a network (e.g. WURFL traffic, traffic over the TV white space, etc.) in order to capture the cognitive radio parameters. The captured parameters can then be analyzed and translated into cognitive radio specific expressions. Alternatively, or additionally, the cognitive radio privacy platform 103 may use interrogation methods for cognitive radio parameter interaction, wherein interrogation involves collection of knowledge about occupied channels (e.g. channel numbers, users identities, etc.), informing other entities of the knowledge, providing protocols for negotiation with other entities and negotiating with other entities via certain rules, configurations, etc.

In one embodiment, the capabilities/parameters determination module 207 stores the one or more cognitive radio parameters in at least one information space 113*a*-113*m*, storage 211, or a combination thereof, wherein the parameters can be accessible to one or more cognitive radio enabled UEs 107*a*-107*i*.

In one embodiment, per step 311 of FIG. 3, the capabilities/parameters determination module 207 causes, at least in part, a designation of one or more privacy zones among the UE 107*a*-107*i*, the one or more other UEs 107*a*-107*i*, or a combination thereof. A privacy zone is dependent on cognitive radio location parameter and whether the cognitive radio allows computational support to apply certain computational level in a specific privacy case. For example, a country-specific privacy may restrict certain cognitive radio privacy enabler functionalities to invalidate particular cognitive radio parameter visibility at one or more zones, or locations. It is noted that the one or more privacy zones can based, at least in part, on the one or more cognitive radio parameters that were determined per step 309 of FIG. 3.

In one embodiment, per step 313 of FIG. 3, the capabilities/parameters determination module 207 determines social networking information associated with the UE 107*a*-107*i*, the one or more other UEs 107*a*-107*i*, or a combination thereof. For example, if the requester is "a friend of me", based on a social network information, the privacy settings are verified and validated against the privacy settings in the privacy database, to check whether the requester is allowed to access "my social network data". A friend logs in to system with an ID and by providing credentials and location information in the cognitive radio environment.

In one embodiment, per step 315 of FIG. 3, the policy application module 209 causes, at least in part, a signing of the one or more operations, the cognitive radio information, or a combination thereof based, at least in part, on the one or more privacy policies. It is noted that, the policy application module 209 interacts with privacy database for cognitive radio specific parameters (e.g., location, regulation, frequency, etc.). In this embodiment, the cognitive radio data is signed by privacy policy. Furthermore, cognitive radio parameters and various combinations of the parameter are signed by the privacy policy. The parameters signed by privacy policy are cognitive radio location data, cognitive radio regulation data, cognitive radio frequency data, combinations of cognitive radio location and regulation, location and frequency, etc.

In one embodiment, the privacy mechanism utilized in the cognitive radio environment may consist of common information sharing and coexistence management with the distributed Information architecture (e.g. cloud). In this embodiment, an input can be signed by the policy application module 209 at different levels (e.g. cloud level) and results can be filtered using the cognitive radio parameters determined by the capabilities/parameters determination module 207. The policy application module 209, renders cognitive radio specific database information (e.g. location, legislation/regulation/frequency information, mobility API, etc.), and applies certain privacy policy enforcement (e.g. anonymization, encryption or filtering) for the signed functional flow.

In one embodiment, the components of the cognitive radio privacy platform 103 (privacy enablers) can be placed along the two endpoints of the cognitive radio system, namely on the requester side and on the target side. The cognitive radio data can be signed by privacy policies, location data, regulation data or a combination thereof and therefore the cognitive radio data is attached to privacy signatures.

In one embodiment, per step 317 of FIG. 3, the policy application module 209 processes and/or facilitates a processing of the one or more privacy policies to determine an availability, a restriction, or a combination thereof of the cognitive radio information. In one embodiment, the availability or restriction of the cognitive radio information can be based, at least in part, on the one or more anonymization processes, the one or more encryption process, the one or more filtering processes determined per step 305, or a combination thereof. Additionally, the availability or restriction of the cognitive radio information can be based, at least in part, on the on the one or more zones determined per step 311, the social networking information determined per step 313, or a combination thereof.

In one embodiment, per step 319 of FIG. 3, the policy application module 209 checks the results from step 317 determining the availability or restriction of the requested cognitive radio information. If the results show the availability or restriction of cognitive radio information, per step 321 of FIG. 3, the policy application module 209 causes, at least in part, the performing of the one or more operations based, at least in part, on the availability or restriction of the cognitive radio information. In various embodiments, the performing of the one or more operations can be further, based at least in part, on the one or more capabilities, the signing, or a combination thereof.

It is noted that, the policy application module 209 may acquire the operations based on sniffing, interrogation, agreements, as previously discussed, or a combination thereof among the UE 107a-107i, the one or more other UEs 107a-107i, or a combination thereof.

In one embodiment, if the results from step 317 indicate that the cognitive radio information is unavailable, per step 323 of FIG. 3, the policy application module 209 causes, at least in part, a restriction of access to at least a portion of the cognitive radio information associated with the UE 107a-107i.

FIGS. 4A-4B are diagrams of cognitive radio privacy infrastructure, according to various embodiments. In one embodiment, privacy mechanism utilized in a cognitive radio environment consists of common information sharing and coexistence management within a distributed information architecture in which input is signed by a policy application module 209 of the cognitive radio privacy platform 103 at different levels of hierarchy. For example, as seen in FIG. 4A, the cognitive radio environment 401 consists of a local level 403a and a cellular level 403b. In a device level, the UEs 107a and 107b are equipped with sets 405a and 405b of Radio Frequency (RF) memory tags. Additionally the device level has connectivity to the privacy enabler 407a, while the cognitive radio level 401 is accessed by the privacy enabler 407b while the privacy enablers 407a and 407b are components of the cognitive radio privacy platform 103 and able to communicate with each other. In one embodiment, the privacy enablers 407a and 407b control the privacy of the information sharing between the UEs 107a and 107b with the cognitive radio environment 401.

In one embodiment, each privacy enabler 407a and 407b may have different privacy enabler modes that are enabled based on the kind of regional cognitive radio network that is currently operated in the cognitive radio environment 401. For example, in a situation where UEs 107a and 107b are in close proximity distances, a certain privacy enabler mode can be activated while in a wider area a different privacy enabler mode may be used. In another instance, if a UE 107a needs to power the peer device 107b again this situation may lead to the activation of yet another privacy enabler mode.

FIG. 4B depicts the connection between a privacy enabler 407b with the privacy database 409 and the cognitive radio database 411. The privacy enabler 407b renders cognitive radio specific information of database 411 (e.g., location, legislation/regulation/frequency information, etc.) and applies certain privacy policy enforcement (e.g. anonymization, encryption or filtering) from the privacy database 409 for each signed functional flow.

In one embodiment the cognitive radio specific operations are sniffed or interrogated and agreed locally with cognitive radio specific API that is signed based on one or more privacy policies by the privacy enabler 407b. Subsequently, the cognitive radio operations are validated against the privacy policy database 409 (e.g. by having commonalities with information spaces 113a-113m). The cloud 111aq-111n functions as an implementation providing communication guidelines between the cognitive radio privacy platform 103 and the cognitive radio environment 401.

Figure 5:
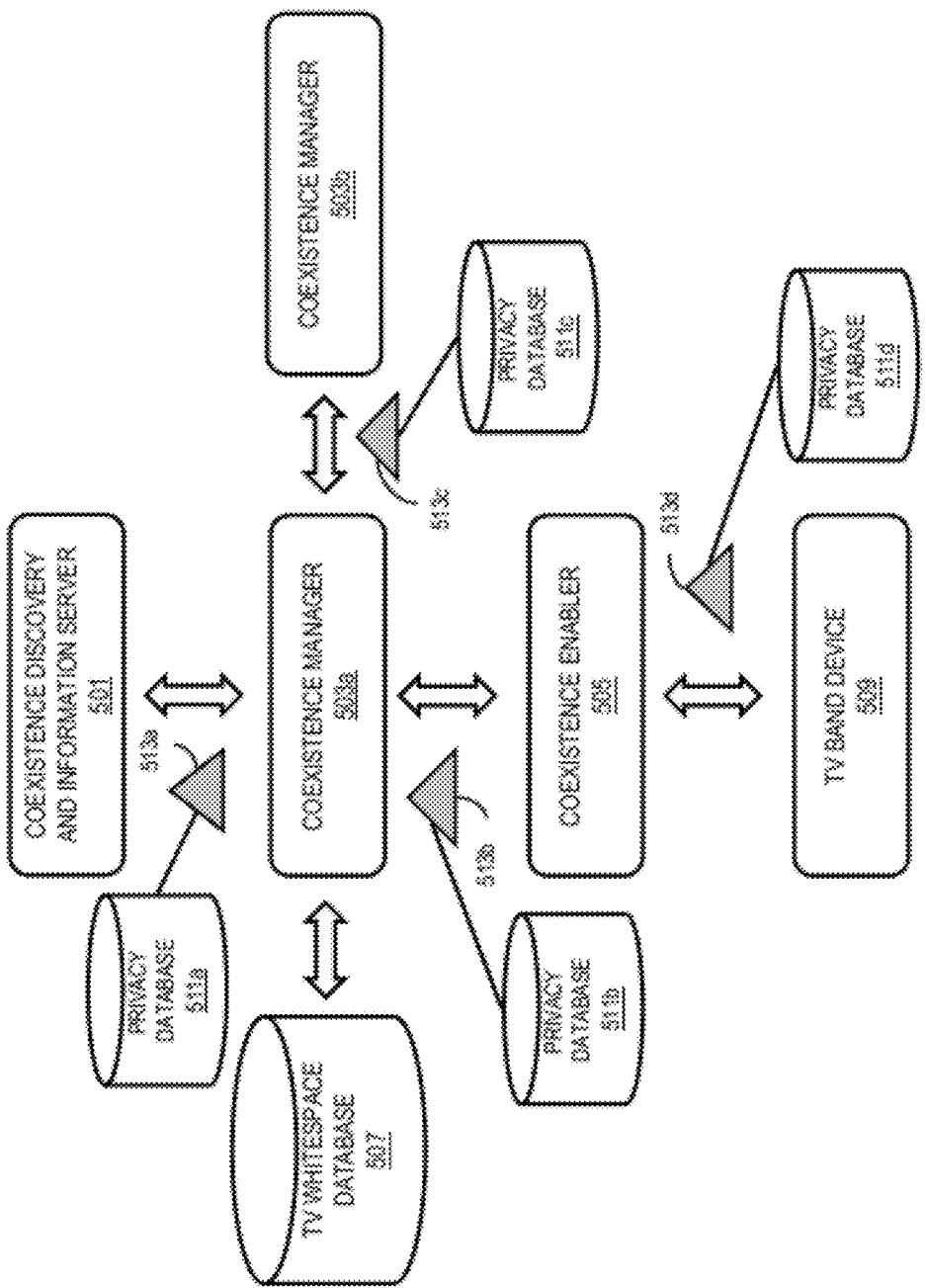
FIG. 5 is a diagram of TV white space cognitive radio architecture with privacy, according to one embodiment.

FIG. 5 is a diagram of TV white space cognitive radio architecture with privacy, according to one embodiment. In one embodiment the Coexistence Discovery and Information Server (CDIS) 501 supports discovery of Coexistence Managers (CMs) 503a in the network and collects aggregate information from other components of the network, wherein each coexistence manager 503a discovers other CMs 503b, performs decision making processes for coexistence of entities on the band, and supports exchange of information among entities and between different CMs 503a, 503b, etc. Additionally, the CMs 503a and 503b have access to the TV white space database 507 in order to discover other CMs and support exchange of information. The Coexistence Enabler (CE) 505 requests and obtains information, required for coexistence, from the TV-band Device or network (TVBD) 509, wherein TVBDs are new unlicensed radio frequency devices operating in the vacant channels or white spaces. Furthermore, the CE 505 translates reconfiguration requests and/or commands to TVBD specific format. This represents the architecture for TV white space cognitive connectivity, being standardized in IEEE 802.19.

In the embodiment of FIG. 5 the privacy enablers 513a, 513b, 513c, and 513d control the privacy of cognitive radio information sharing respectively between the coexistence discovery and information server 501 and the coexistence manager 503a, between the coexistence manager 503a and the coexistence enabler 505, between the coexistence manager 503a and the coexistence manager 503b, and between the coexistence enabler 505 and the TV band device 509. Each privacy enabler 513a-513d also has connectivity to a privacy database 511a-511d, wherein the privacy databases 511a-511d may be distributed databases communicating with each other, be components of a centralized database, or a combination thereof.

In one embodiment, the privacy enabler 513d sets the privacy client for the path between TVDB 509 and the coexistence enabler 505 to "ON" status and updates selected rules and settings in the privacy database 511d.

In one embodiment, the coexistence enabler 505 requests capabilities from the coexistence manager 503a. the privacy enabler 513b checks the privacy database 511b for answers to questions such as, "what is the cognitive enabler allowed to do?" using the privacy enabler 513b settings as parameter.

In one embodiment, the coexistence manager 503a collects information such as locations, request neighborhood ("who else is there") etc. from the coexistence discovery and information server 501, using privacy enabler 513a settings as parameter.

In one embodiment, the coexistence manager 503a may be local while the coexistence manager 503b be a remote coexistence manager, wherein the privacy of interaction between the coexistence managers 503a and 503b can be may provided by the privacy enabler 513c associated with the privacy database 511c.

In one embodiment, a white space architecture 507 may utilize privacy policy rules for what data it is allowed to access (from upper levels of the architecture) and what it is not, for example, by setting a privacy enabler on or off. Additionally, each level of the architecture can be treated independently with privacy policy rules for what they are allowed to forward (as plain visible text, and what they are not) between the cognitive radio white space blocks. Those blocks may also have the ability to independently utilize other (or same) privacy policy rules for output data.

Figure 6:
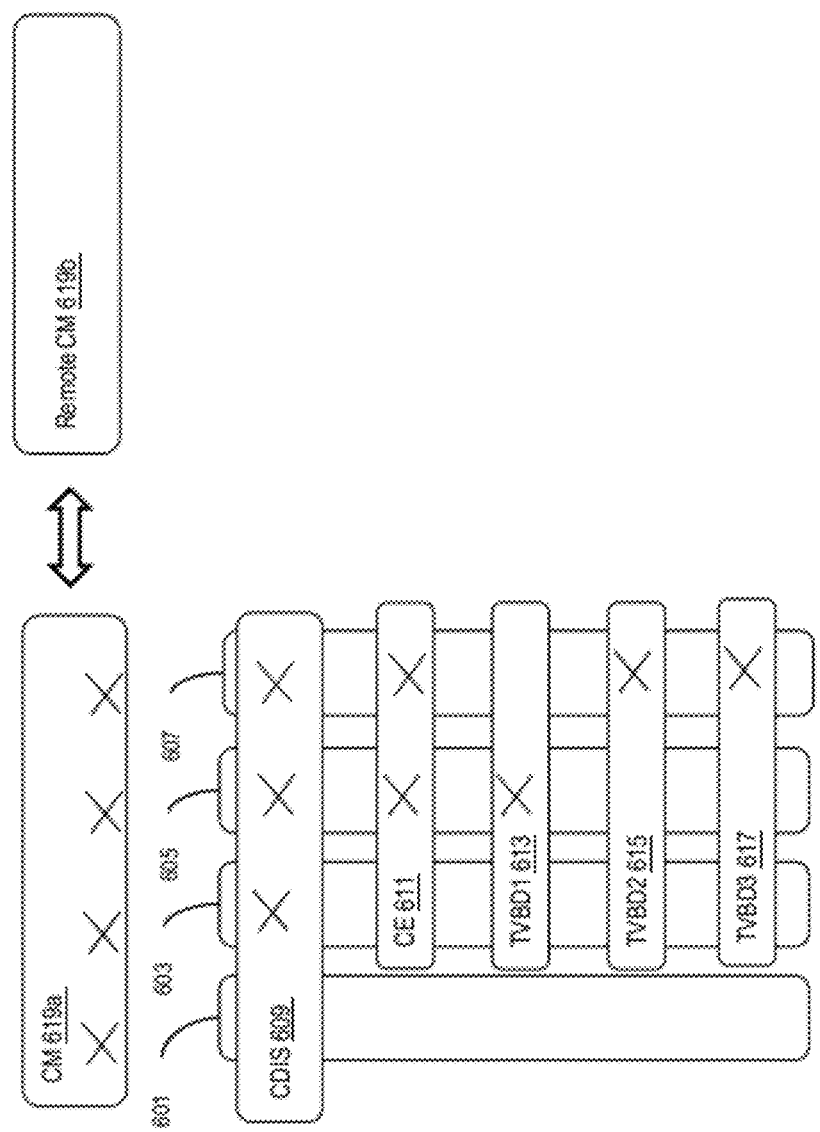
FIG. 6 is a diagram of privacy trees, according to one embodiment.

FIG. 6 is a diagram of privacy trees, according to one embodiment. In one embodiment the cognitive radio privacy platform 103 provides a way to form a privacy tree (hierarchical privacy), wherein the coexistence managers form wider privacy capabilities while other elements of the cognitive radio provide narrower privacy capabilities. Additionally, privacy enabler can be set to form a flat hierarchy privacy, with equal privacy settings throughout the cognitive radio environment.

In the embodiment of FIG. 6, four privacy trees 601, 603, 605, and 607 are formed. For example, tree 601 can be the authority tree that functions as a regulator, while tree 603 can be a local tree considering the local capabilities of the cognitive radio elements. Additionally, tree 605 may include privacy setup for the cloud 111a-111n and tree 607 may cover privacy setup for a region (e.g. composed of several local environments).

In one embodiment, as seen in FIG. 6, the coexistence managers 619a and 619b can select a wider range of privacy to manage (shown as trees 601, 603, 605, and 607) based on privacy setup by the cognitive radio privacy platform 103, while the coexistence enabler 611 enables a certain privacy path (e.g. 605, and 607 shown with X signs) based on the setup. Additionally each TVBD 613, 615 and 617 can select and manage its own content based on privacy setup. In the example of FIG. 6 the CDIS 609 has access to trees 603, 605, and 607.

Figure 7A:
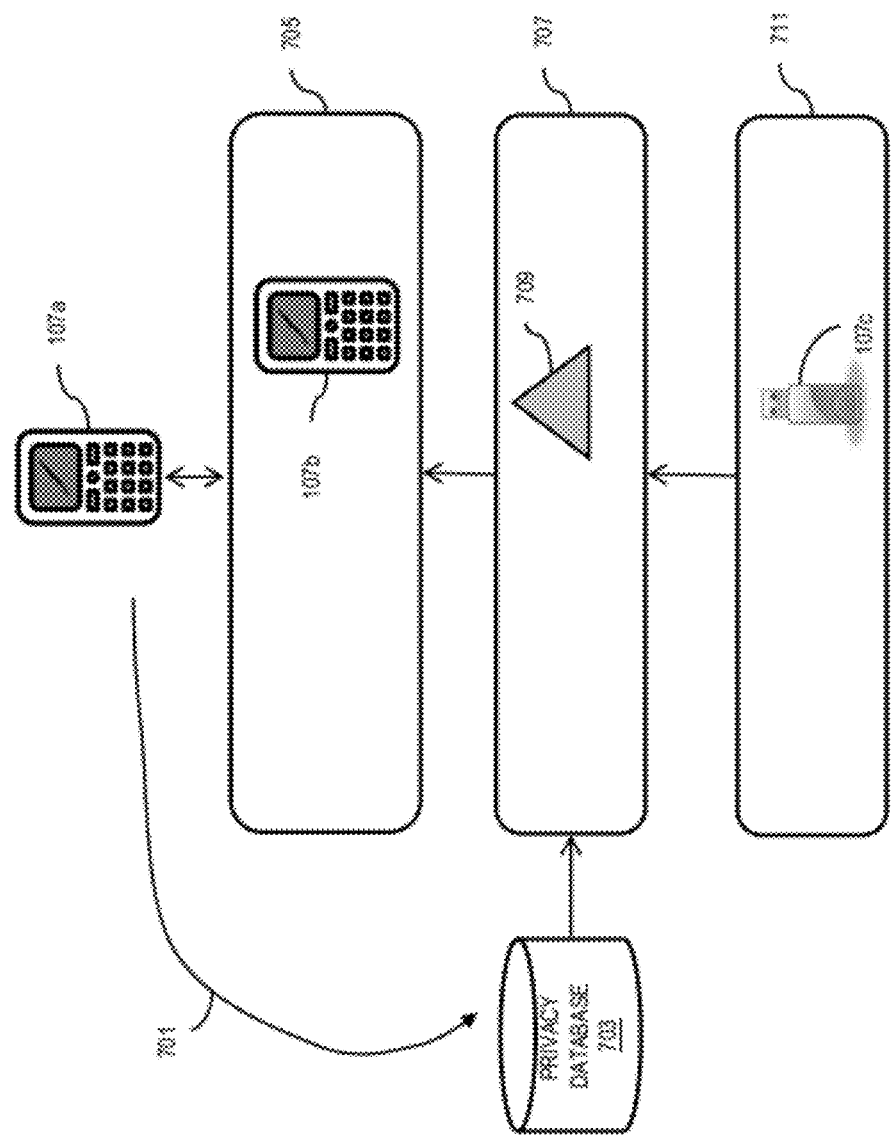
FIGS. 7A-7B are diagrams of cognitive radio access restrictions, according to one embodiment.
Figure 7B:
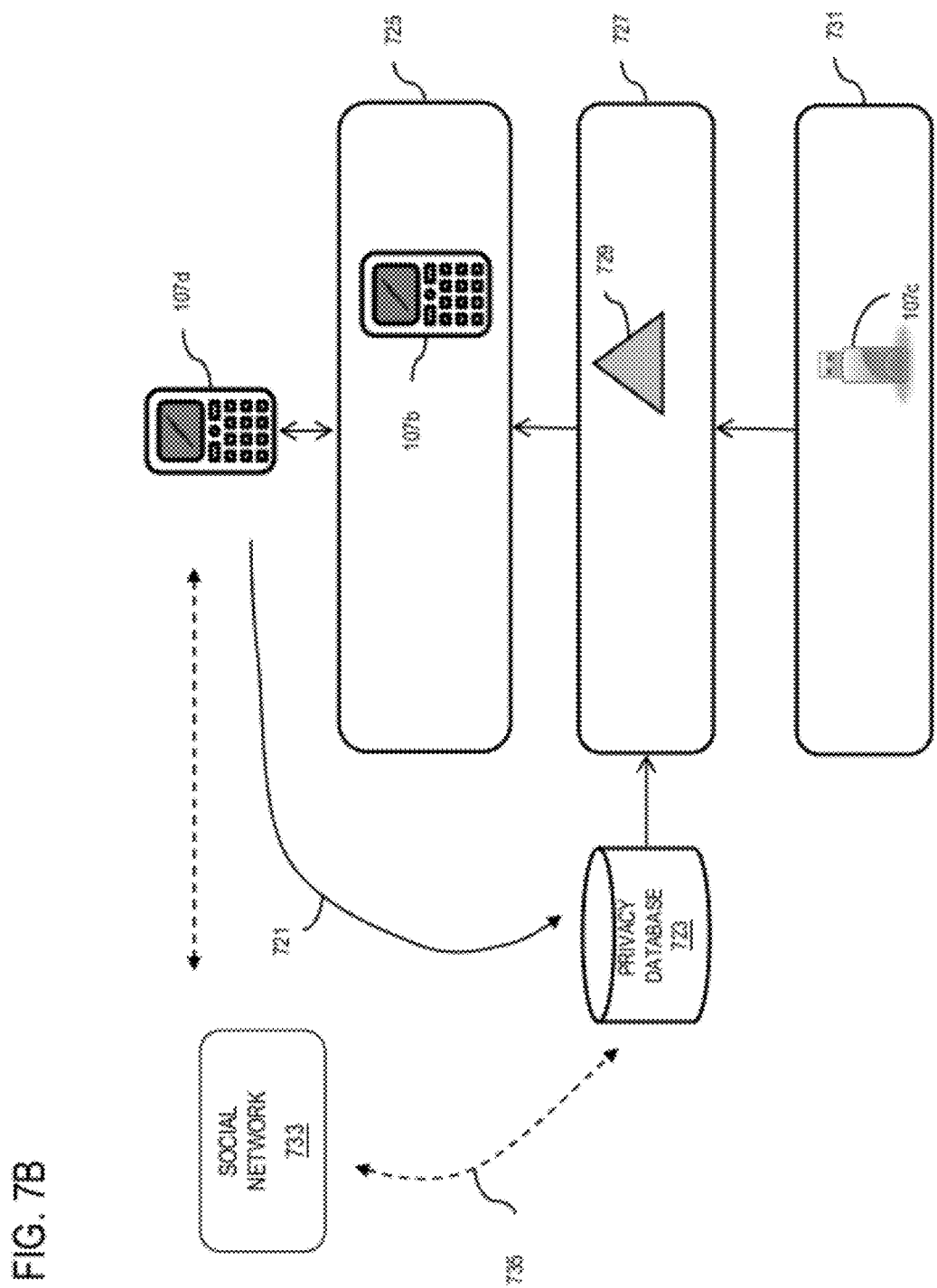

FIGS. 7A-7B are diagrams of cognitive radio access restrictions, according to one embodiment. FIG. 7A is a diagram of "me and my data" use case, according to one embodiment. In one embodiment, the user of UE 107a requests the cognitive radio privacy platform 103 to restrict access to his/her information only to UE 107a. The request is stored in privacy database 703 (shown via arrow 701). Subsequently, the privacy enabler 709 controls that only UE 107a (as the requester) and the user's other cognitive radio devices are able to access the user's cognitive radio data, and no other device. This can restrict certain cognitive radio parameters (location, legislation, frequency, and other cognitive radio data) from being freely available to all cognitive radio devices. For example, any access by devices 107b and 107c respectively within cognitive radio components 705 and 711 to the data associated with UE 107a and its user, will be controlled by the privacy enabler 709. The access will be allowed only if the devices 107b and 107c are associated with the same user as device 107a. For example, location is an important cognitive radio parameter that determines whether a requester 107a is able to access to user's data in cognitive radio environment. In one embodiment, the user sets an ID (indicating "it is me"), credentials and location data (derived or set) which are verified against the content of privacy database 703. The privacy enabler 709 combines privacy settings (parameters, rules, results that enable certain part of the document) with the actual dataflow (e.g. "my data") while responding to the request from UE 107a.

FIG. 7B is a diagram of "my social network data" use case, according to one embodiment. In FIG. 7B the requester (user of UE 107d) is a friend of the cognitive radio information owner on a social network 733. The requester logs in to the social network 733 by providing his/her ID, credentials, location, etc. to the cognitive radio privacy platform 103 and the provided information are verified against the privacy database 723 (shown by arrow 721), the cognitive radio privacy platform 103 can communicate with the social network 733 (shown by arrow 735) in order to verify the requesters credentials and identity. The privacy settings are verified and validated with privacy settings at the database 723, for example, to check whether the requester 107d is allowed to access to "my social network data".

In one embodiment, if the requester is a device or an application, the cognitive radio privacy platform 103 verifies and validates privacy settings against the privacy settings at the privacy database 723, for example, to check whether the requester is allowed to access the information, whether the privacy ID of the requester matches with the privacy database 723 content and whether the credentials and location information match privacy signed cognitive radio information (e.g. the cognitive radio environment wherein the privacy enabler 729 is active).

In one embodiment, if the requester is a passive RF memory tag, the device that powers the tag is considered as logical requester whose credentials are checked by the privacy enabler 729 at the privacy database 723. The privacy enabler 729 also verifies whether the RF tag and its content is visible from privacy point of view.

In some embodiments, a privacy enabler 729 may request to temporarily suspend certain information path when privacy enabler provides special treatment for certain direction, user, friend, device, application, etc. For example, at certain locations privacy settings may treat certain information as secret, not to be taken away from that location. In this situation, the privacy enabler 729 may suspend all device intra and intercommunication paths to/from the certain device except the processes that are performed at that location. The privacy enabler may also suspend some local processing which is not allowed based on privacy settings.

Figure 8:
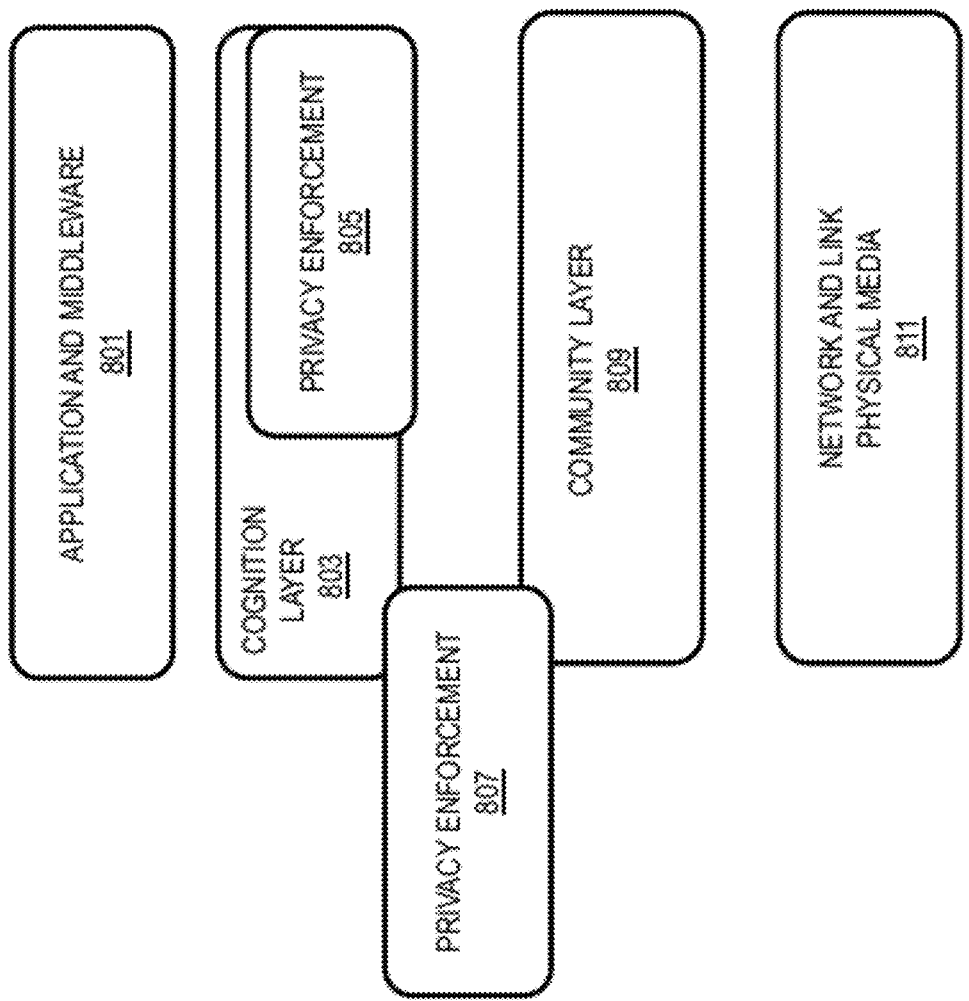
FIG. 8 is a diagram of cognitive radio privacy enforcement in ad-hoc mesh network environment, according to one embodiment.

FIG. 8 is a diagram of cognitive radio privacy enforcement in ad-hoc mesh network environment, according to one embodiment. As previously discussed, an ad-hoc mesh network is, for instance, a serverless device-to-device network created using short-range radio technology (e.g., wireless local area network (WLAN) or Bluetooth®). Within the ad-hoc mesh network, each wireless device 107a-107i may be mobile and is within communication range of any number of other wireless devices 107a-107i. Accordingly, the set of wireless devices 107a-107i that is within communication range of any a particular wireless device 107 is transient and can change as the wireless devices 107a-107i move from location to location.

In one embodiment, in the ad-hoc mesh network structure shown in FIG. 8, the privacy enforcements 805 and 807 are placed in cognition layer 803 and the community layer 809. Cognition privacy enforcement 805 sets rules for publishable and searchable items, filters cognition layer items properly either independently (only at that layer) or together with the other privacy enforcement parts below the cognition layer (mainly filtering community layer 809).

In one embodiment, the privacy enforcement 805 in cognition layer controls that access restriction are applied to what services and/or items, how wide the restriction is applied, and what cognition functionalities it includes (e.g. privacy policy rules applied on search function, etc.)

In one embodiment, in community layer 809 the privacy enforcement 807 controls that access restrictions are applied to what services, what interactions, what community layers with defined/selected privacy policy rules.

It is noted that, the ad-hoc mesh network environment may consist of access API, which is wrap with privacy enabler API. The privacy enforcement 805 may affect certain or all cognition layers 803 service components (e.g. search, subscribe, query, etc.) Additionally, the privacy enforcement 807 on the community layer 809 may provide privacy for different sets of communities and their manager operations. Furthermore, privacy enforcement may affect community members, and community layer messaging operations.

Figure 9:
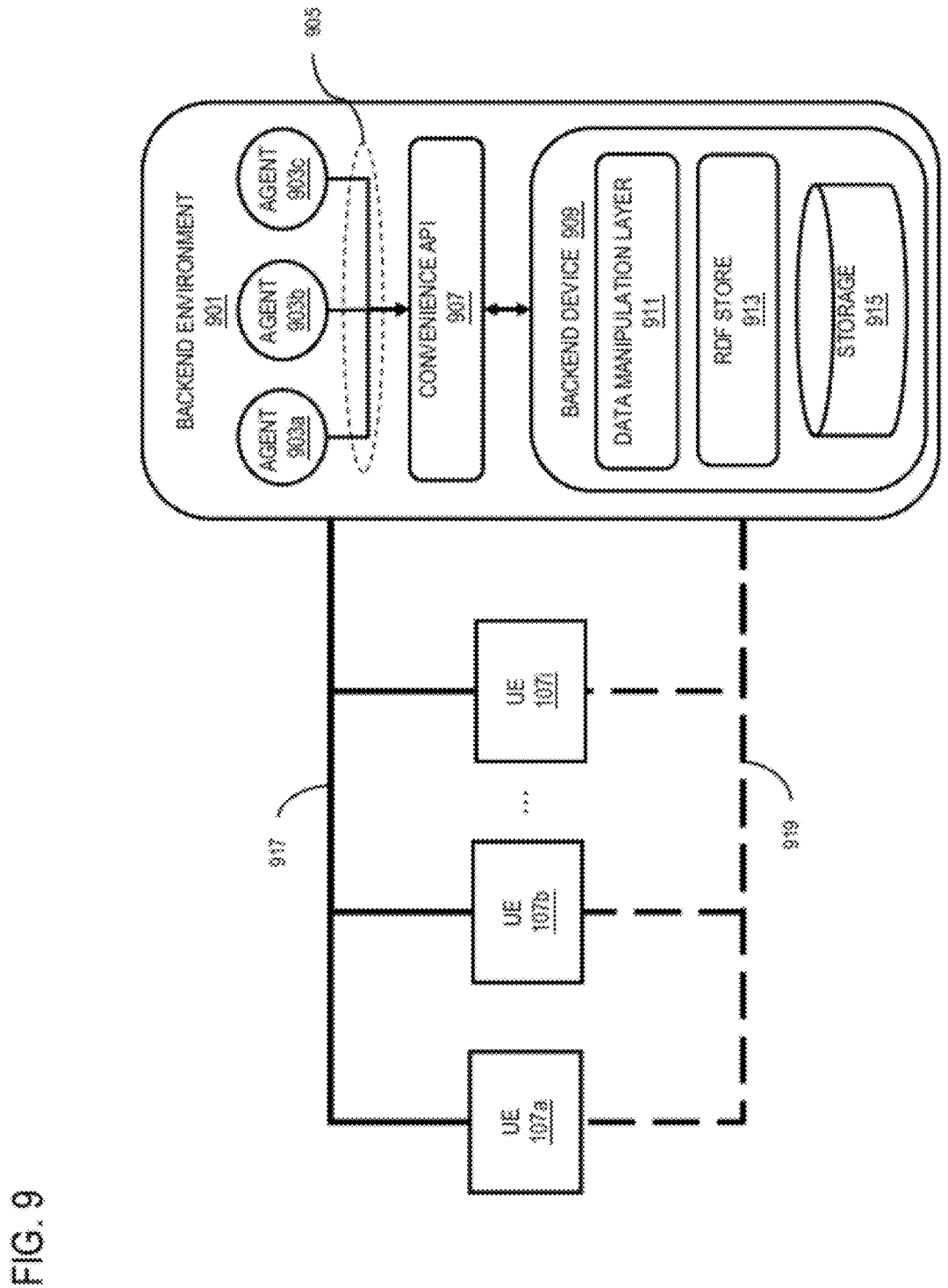
FIG. 9 is a diagram of using cloud environment for sharing cognitive radio information, according to one embodiment.

FIG. 9 is a diagram of using cloud environment for sharing cognitive radio information, according to one embodiment. In one embodiment, utilizing cloud environment 111a-111n for sharing cognitive radio information, provides broader information sharing structure than, for example, what WURFL provides. The cognitive radio structure can utilize WURFL as a interoperable service (along with other data sources), wherein the WURFL may access the backend environment 901 and provide direct cognitive radio specific access to UEs 107a, 107b, . . . , 107i with necessary parameters. If, information sharing via WURFL fails to extract and provide various cognitive radio parameters such as location, frequencies, etc. any other suitable data sources (service provides) can be utilized to reconstruct such information or derive it from other data.

In one embodiment, the backend environment 901 is a network infrastructure. The backend environment may also be a virtual run-time environment within a cloud 111a-111n associated with the owner of one or more UEs 107a-107i or on another UE 107b associated with the user. The backend environment 901 may include one or more components (backend devices) 909 and one or more Application Programming Interface (API) such as a convenience API 907 that may include APIs tailored to the software development environments used (e.g. JAVA, PHP, etc.). Furthermore, UEs 107a-107i may include client APIs (not shown) each API enabling interaction between devices and components within another device or an environment. For example, the convenience API 907 enables interaction between the backend device 909 and agents 903a, 903b, and 903c, wherein each agent is a set of processes that handle computations within the backend environment 901. Connections 917 and 919 respectively represent distribution paths of data and control among the environment 901 and UEs 107a-107i. The storage 915 is a repository of information and computations that can be accessed and used by all the UEs and infrastructure components having connectivity to the backend environment 901.

In one embodiment, the backend device 909 may be equipped with a data manipulation layer 911 that monitors and manages any access to the storage 915.

In one embodiment, the cognitive radio privacy platform 103 extracts cognitive radio specific parameters, by sniffing, interrogation, or a combination thereof, from the backend environment 901 associated with cloud 111a-111n and translates the parameters into specific expressions of the cognitive radio. The cognitive radio privacy platform 103 may also utilize storage 915, which is part of the information space 113a-113m, for storing shared cognitive radio information, white space database, or a combination thereof.

In one embodiment, one or more UEs 107a, 107b, . . . , 107i may request and inform their (spectrum) findings to the common cognitive radio database (e.g. storage 915 in the backend device 909, storage 211 of cognitive radio privacy platform 103, backend environment 901, or a combination thereof). In response, the backend device 909 may send settings and other response information back to configure UEs 107a-107i. The cognitive radio privacy platform 103 (shown in FIG. 1) may monitor correct utilization of the received settings by the UEs 107a-107i at certain locations, under certain regulations, etc.

The backend environment 901 may include several layers (e.g. L1, L2, L3) shown as circle 905, which provide fine instruments for developers to access particular layers for development. The layers 905 describe different abstraction layers attached to different convenience layers, convenience API 907. In one embodiment, the cognitive radio functions can be mapped to level L3 as a cognitive radio domain specific API. The cognitive radio domain can be built based on location, frequency and rules information.

In one embodiment, the cloud 111a-111n may have a platform API, which is specific to mobile applications, defining location, bearer, short range communications, etc., and when cognitive radio specific functions (e.g. cognitive radio domain information) are mapped into the platform API, it forms a cognitive radio specific platform API.

In one embodiment, the Data Manipulation Layer (DML) 911 provides connectivity, privacy, security policies API, which will fetch policy rules from storage 915 or any other storage spaces associated with cloud 111a-111n and apply them to the ongoing data-stream.

In one embodiment, the cognitive radio database information, is based on locations wherein each location may be under certain regulations (legislation), allowing certain frequencies to be used at the location.

In one embodiment, as previously described, there may be two options (functions) for cognitive radio specific operations, namely, sniffing (associated radio sensing and listen before talk) such as for example, transmitting, sniffing vacant channels (channel numbers, characteristics); and interrogation (with local agreement). In the interrogation method, the cognitive radio privacy platform 103 has knowledge of occupied channels and provides protocols for communication among UEs 107a-107i, including rules, candidate neighbors, operation and measurement configurations, etc.

In one embodiment, sniffing includes scanning the environment, whereas interrogation provides more local and global interactions, also selecting the used setup. Sniffing is a subset of interrogation, as interrogation provides more information.

Figure 10:
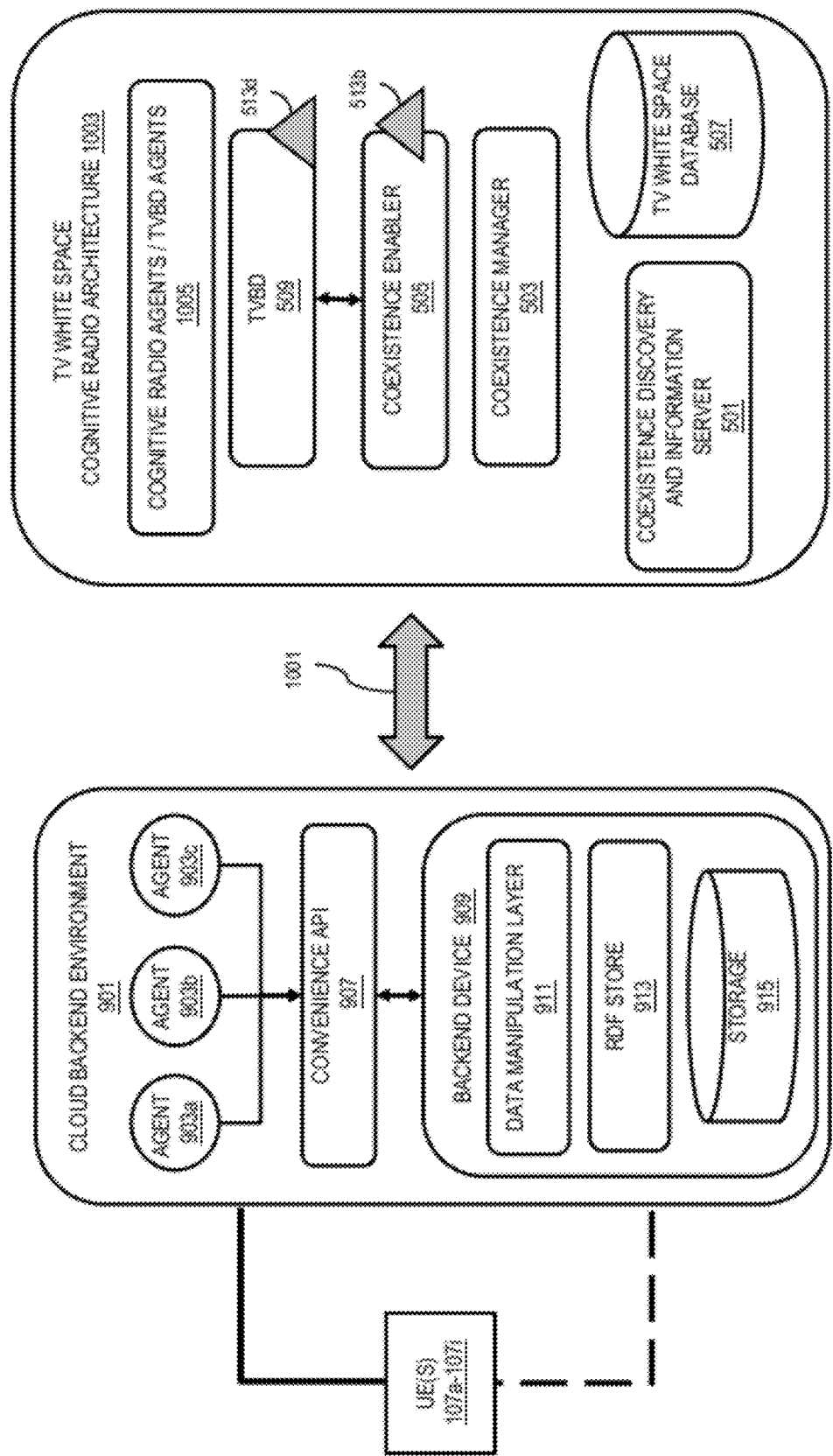
FIG. 10 is a diagram of mapping between cloud environment and cognitive radio environment, according to one embodiment.

FIG. 10 is a diagram of mapping between cloud environment and cognitive radio environment, according to one embodiment. In one embodiment, the cognitive radio enabled UE 107a-107i requests the cloud backend environment 901 generalized representation, wherein the TV white space cognitive radio architecture 1003 is mapped to the backend environment 901 (shown as arrow 1001).

In one embodiment, the cognitive radio privacy platform 103 uses sniffing or interrogation methods and reutilizes the methods in the convenience API 907. The cognitive radio specific API may consist of information such as regulations, bandwidth information and their characteristics, etc. in order to provide cognitive radio specific operations, method of choice (e.g. sniff or interrogate the cognitive radio information from the environment 1003).

In one embodiment, mapping 1001 is performed on the technologies of the CR architecture environment 1003 and the cloud backend environment 901. The cognitive radio functionality information, such as for example location, regulation, frequency, etc. which can be extracted from a cognitive radio specific database (not shown) can be mapped to, for example, platform API, so that the technology map is:

Location (CR)→Location API
Legislation/Regulation (CR)→Connectivity/Privacy/Security Policies API
Frequency (CR)→NEW (or Bearer API)

In one embodiment, the cognitive radio specific API may consist of location API, Connectivity/Privacy/Security Policies API, frequency API or a combination thereof. As seen above, the frequency API may be a new API at the backend environment 901. Alternatively, the frequency can be mapped to a current Bearer API (not shown). The cognitive radio privacy platform 103 may use sniffing, interrogation or a combination thereof to determine vacant and occupied frequencies with support from cloud environment 901.

In one embodiment, for example, a cognitive radio enabled UE 107a may be associated with a specific location and the connectivity, privacy, security policy rules (API, regulation) with tune up parameters attached to the location. In this embodiment, particular information associated with the location can be extracted from the cloud 111a-111n.

In another embodiment, a cognitive radio enabled UE 107b may be associated with a specific location and the connectivity, privacy, security policy rules (API, regulation) with tune up parameters attached to the location and to a selected frequency. In this embodiment, particular information associated with the location and the frequency can be extracted from the cloud 111a-111n.

In one embodiment, a cognitive radio enabled UE 107c may request direct subscription for device to device communication from location parameters, cloud backend environment Data Manipulation Layer 911 figuring equivalent parameters and enabling these devices to communicate directly. If no DML database exists, a wrapper may be used to provide connection to device storage 915.

In one embodiment, a virtual copy of the local findings and settings of cloud based cognitive radio database can be used at UE level (locally) to allow direct device to device (e.g. UE to UE) cognitive radio connections. The two UEs can form a group in which findings and settings are treated as group findings, and are updated to the backend 901 as well.

In one embodiment, personal or private area settings on a UE 107a may be locally available on a Radio Frequency (RF) memory tag (e.g. home mode, wherein the cognitive radio environment may be more static than other outdoor or public environments), where each cognitive radio enabled UE 107a-107i can pull and push settings for that area from/to RF memory tag. In this embodiment, cognitive radio parameters may be determined periodically or at every touch to the RF memory tag and the determined parameters stored in the RF memory tag for later use and for other UEs to use.

In one embodiment, the privacy enabler 513d and 513b locations in FIG. 10 can be at the edge of the device access to cognitive radio (e.g. between coexistence enabler and TV band device), where privacy policy applied to single device level (about "Me and my data" or "friend" privacy of FIGS. 7A-7B). Additionally privacy enabler may consist of multiple device privacy policies entering the cognitive radio environment, where privacy policy also takes into account cognitive radio specific coexistence parameters enabling common or separate privacy policies (and privacy zones between those devices). Privacy zone is dependent on cognitive radio location parameter; whether cognitive radio allows computational support to apply certain computational level for this privacy case (e.g. country specific privacy may restrict certain cognitive radio privacy enabler functionality to invalidate particular cognitive radio parameter visibility at that zone, or location).

Figure 11:
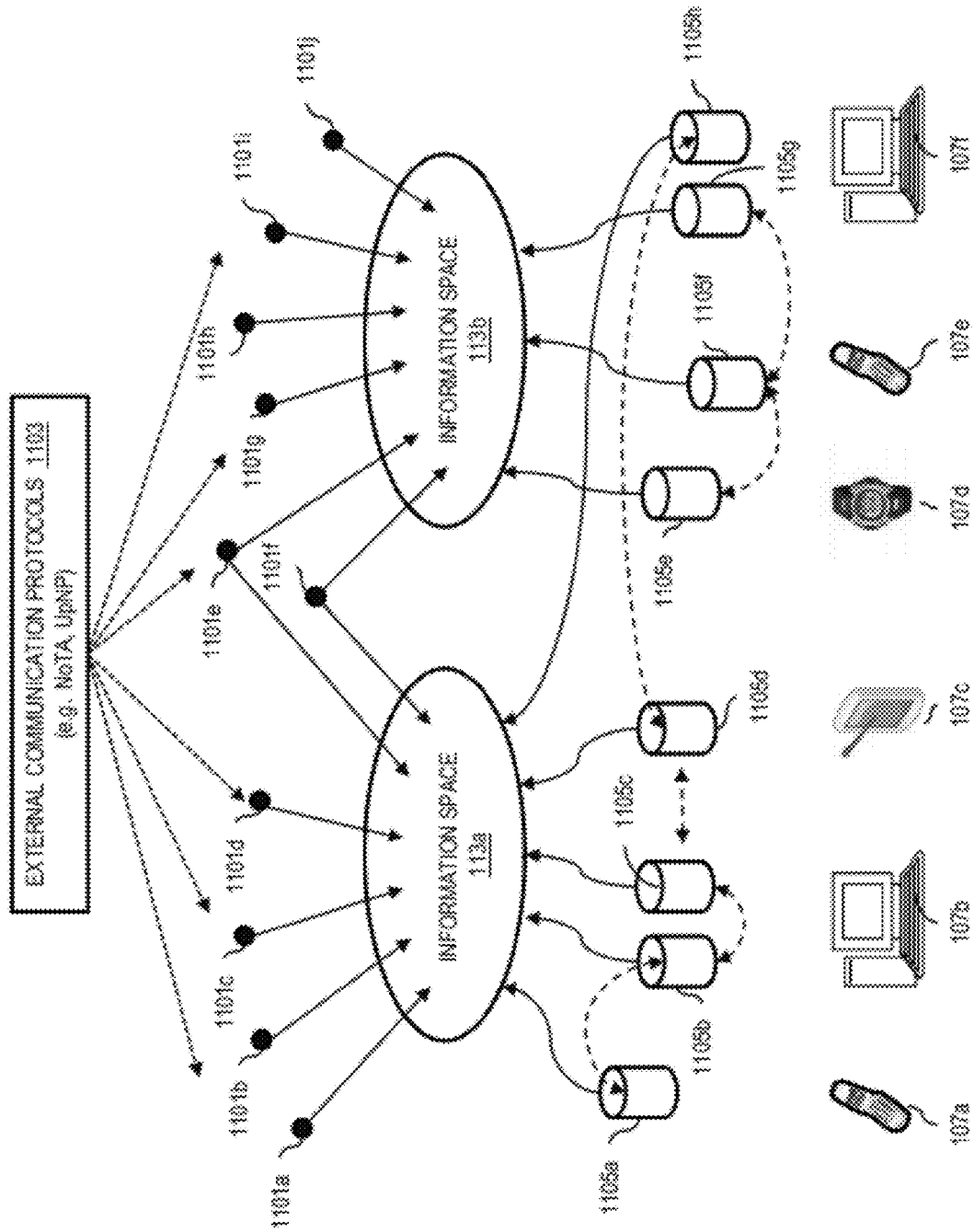
FIG. 11 is a diagram of an information space architecture used for providing cognitive radio information sharing, according to one embodiment.

FIG. 11 is a diagram of an information space architecture used for providing cognitive radio information sharing, according to one embodiment. In FIG. 11 two information spaces 113a and 113b are connected to knowledge processors 1101a-1101j. Some of the knowledge processors such as 1101e and 1101f are connected to more than one information spaces. In addition, some knowledge processors 1101 use external communication protocols 1103 outside of the information spaces environment. For example knowledge processors 1101c, 1101d and 1101e may be connected through the NoTA network while knowledge processors 1101e, 1101g and 1101j are connected through UPnP network. The knowledge processors 1101a-1101j may each consist of components such as user-interfaces, internal logics, connectivity components, etc. (not shown). A knowledge processor 1101a-1101j may generally run on a single device, even though it may have internal distribution. Such a device may be a mobile device/phone, personal computer, active sensor, Radio Frequency Identification (RFID) tag, etc.

The connectivity component of the knowledge processors 1101a-1101j (not shown) contains the logic and functionality to communicate to various information spaces 113a-113m. Connectivity is over some network protocol to a semantic information broker (SIB) 1105a-1105h. A semantic information broker 1105a-1105h contains the logic for parsing messages and pointers to subscription handlers between the knowledge processors 1101a-1101j and the information space 113a. A knowledge processor 1101a-1101j may potentially connect to more than one information spaces at a time thus distributing and synchronising the operations across all connected information spaces.

The basic functionality provided by the connectivity protocols at this level for manipulating information and for connection to an information space 113a-113m is given below:

Insert: insert information in information space 113a-113m (as an RDF graph) atomically (e.g., at the level of the smallest information element of the information space 113a-113m), Retract: remove information from information space 113a-113m (as an RDF graph) atomically, Update: update information on information space 113a-113m (as an RDF graph) atomically—often implemented as a retract and insert through the transaction system, Query: synchronously (blocking) query; retrieve information from information space 113a-113m, Subscribe: asynchronously (persistent, non-blocking) set up a subscription to the information space 113a-113m for a given query, Unsubscribe: terminate a given subscription to information space 113a-113m, Join: request initiation of an interaction session between a knowledge processor 1101 and a given information space 113a-113m, Leave: terminate the current interaction sessions between a knowledge processor 1101 and the information space 113a-113m.

The information space 113a-113m is "virtual" in nature in the sense that its existence is provided by the underlying semantic information brokers 1105a-1105h which are the elements that "physically" exist. Within the scope of an information space 113a-113m, capabilities for local reasoning over the information contained in that information space are provided through a deductive closure calculation mechanism (not shown). The mechanisms for managing connections and operations of knowledge processors 1101a-1101j and for distributing the information around information spaces 113a-113m can be implemented by more than one SIB 1105 distributed over different processing elements.

The interaction among knowledge processors 1101a-1101j and information spaces 113a-113m is accomplished by network connections to one or more SIBs 1105a-1105h providing or representing the information space. As far as the user or designer of a knowledge processor 1101a-1101j is concerned, there are knowledge processors 1101a-1101j and information spaces 113a-113m and the connectivity layer abstracts away the physical connection to a SIB 1105a-1105h.

Additionally the semantic information brokers 1105a-1105h may be distributed over a number of different devices 107a-107f. For example, SIB 1105a is on device 107a and SIBs 1105b and 1105c are on device 107b. However as seen in FIG. 11 each set of SIBs represent one information space at a time. For example, SIBs 1105a-1105d and 1105h represent information space 113a while SIBs 1105e-1105g represent information space 113b. Some devices can run more than one SIB representing different information spaces concurrently. For example device 107f runs SIB 1105g which represents information space 113b and at the same time runs the SIB 1105h that represents information space 113a.

The system can be implemented on various platforms including mobile devices, personal computers, etc. The main requirement of such implementation platforms is that the devices support the runtime environments and that enough processing power and storage is available. Given that knowledge processors 1101a-1101j can be distributed over devices with more processing power and/or storage as necessary, usually smaller hand-held devices are adequate for running these knowledge processors.

In one embodiment, a SIB 1105a-1105h may run on systems supporting the Python runtime environment and additionally versions for C++ specifically exist for Linux/Unix and Open-C for Symbian operating system, the most widely used open operating system for mobile phones. Client libraries for knowledge processors 1101a-1101j may exist in Python, C, C++(Linux/Unix and Symbian) as well as Java. Other environments based on Web services and Javascript can also be used.

In another embodiment, the system implementations run on Mobile Devices (including: N800/810, N95) and personal computers (Unix, Linux, Windows). The knowledge processors 1101a-1101j can run on sensors, etc. Communication is made over TCP/IP and HTTP protocols which can be used over Ethernet, GPRS and 3G transports.

The information spaces 113a-113m can be represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. For example, RDF is a family of World Wide Web Consortium (W3C) specifications originally designed as a metadata data model. RDF has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF Uniform Resource Identifier (URI) reference (U) or a Blank Node (B), a predicate is an RDF URI reference (U), and an object is an RDF URI reference (U), a literal (L) or a Blank Node (B). A set of such triples is called an RDF graph. Table 1 shows sample RDF triples.

TABLE 1

| Subject | Predicate | Object |
| --- | --- | --- |
| uri://....../rule#CD-introduction, | rdf:type, | uri://............/Rule |
| uri://....../rule#CD-introduction, | uri://....../rule#assumption, | "c" |

The basic operations on an information store are insertion of a graph, retraction (deletion) of a graph, querying and subscription for information. Insertion and retractions may be combined into a single transactional structure in order to admit atomic updates through the atomic application of retract and insert. All other forms of operations are constructions and refinements of the above. For example, update is constructed out of a set of retracts and inserts. Further rewrite rules can simplify the recurrent application of operations.

In one embodiment, a query is evaluated based on the current snapshot of the information in the information space 113a-113m. Queries can be performed by Wilbur query language (WQL) or simple RDF triple pattern matching. WQL is a lisp-like path based query language. One important difference between WQL and RDF triple pattern matching is that Wilbur's static reasoning engine only runs with WQL queries. WQL queries return a set of RDF graph nodes, while the pattern queries return an RDF graph. Furthermore, other query languages such as SPARQL are also supported.

In another embodiment, subscriptions are implemented as persistent queries, that is, a given query is evaluated whenever the information in the information space 113a-113m changes, and thus the same methods are available. The results are transmitted to the knowledge processors 1101a-1101j only when they are changed. Depending on parameters, either the full results or a differential is transmitted.

According to the stated ontologies, no attempt is made by the information space 113a-113m to enforce consistency or integrity of information. However, internal reasoning knowledge processors (not shown) may be present which can perform this activity if the information space 113a-113m has been configured accordingly. Information is explicitly semi-structured and may take on any form that the knowledge processors 1101a-1101j insert or retract.

Presence of typing constructs and namespaces does not necessarily mean that a knowledge processor 1101 querying for that information will interpret the information according to the implied ontology. A namespace is an abstract container or environment created to hold a logical grouping of unique identifiers or symbols (e.g. names). The semantics of the information is interpreted by the reader, merely implied by the writer and grounded in the real world context of the knowledge processors 1101a-1101j. Therefore, any two given knowledge processors may disagree about the semantics. This concept is generally referred to as pragmatic or intentional semantics.

The information spaces 113a-113m provide further functionality regarding the joining and leaving of knowledge processors 1101a-1101j and policy management. Knowledge processors 1101a-1101j have a set of credentials which are passed during the "join" operation. The counterparts of the knowledge processor 1101a-1101j instantiated "leave" and "join" operations are the information spaces 113a-113m instantiated "invite" and "remove" operations. These operations are not necessarily provided by every information space 113a-113m nor understood by every knowledge processor 1101a-1101j.

Connectivity is provided through a set of listeners which provide access via any given specified transport protocol. TCP/IP is the most used transport, but a Bluetooth based listener or one that uses HTTP/S have also been developed. Listeners can provide pre-processing of the incoming messages if necessary; for example with Bluetooth profiles. Any number of listeners may be provided at any time (at least one is necessary).

Furthermore and in some respects similar to that of the principles of information distribution, the connectivity of an information space 113a-113m can also be seen as a union of all listeners in all SIBs 1105a-1105h. However, not all listeners may be available on all physical locations (consider Bluetooth or TCP/IP over WLAN for example).

In one embodiment, the cognitive radio privacy platform 103, performs the process described by the flowchart 300 of FIG. 3 to manage cognitive radio information sharing among cognitive radio enabled devices 107a-107f using the information spaces 113a-113m, wherein the information spaces 113a-113m are configured based on the architecture described in FIG. 11.

The processes described herein for providing privacy in cognitive radio information sharing may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
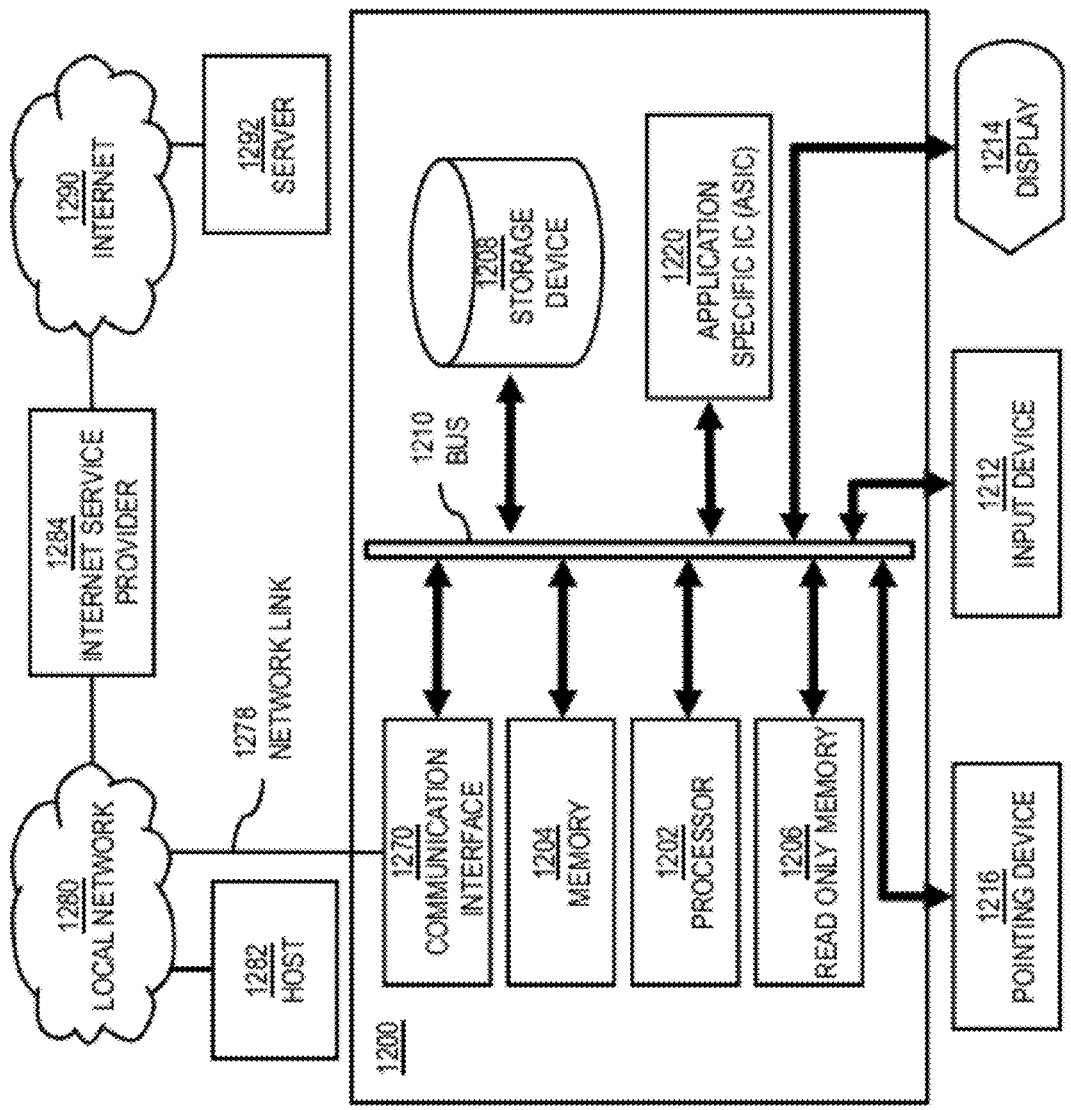
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to provide privacy in cognitive radio information sharing as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of providing privacy in cognitive radio information sharing.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to providing privacy in cognitive radio information sharing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or any other dynamic storage device, stores information including processor instructions for providing privacy in cognitive radio information sharing. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or any other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for providing privacy in cognitive radio information sharing, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT), a liquid crystal display (LCD), a light emitting diode (LED) display, an organic LED (OLED) display, a plasma screen, or a printer for presenting text or images, and a pointing device 1216, such as a mouse, a trackball, cursor direction keys, or a motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of ASICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 105 for providing privacy in cognitive radio information sharing to the UEs 107a-107i.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or any other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set or chip 1300 upon which an embodiment of the invention may be implemented. Chip set 1300 is programmed to provide privacy in cognitive radio information sharing as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of providing privacy in cognitive radio information sharing.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to provide privacy in cognitive radio information sharing. The memory 1305 also stores the data associated with or generated by the execution of the inventive steps.

Figure 14:
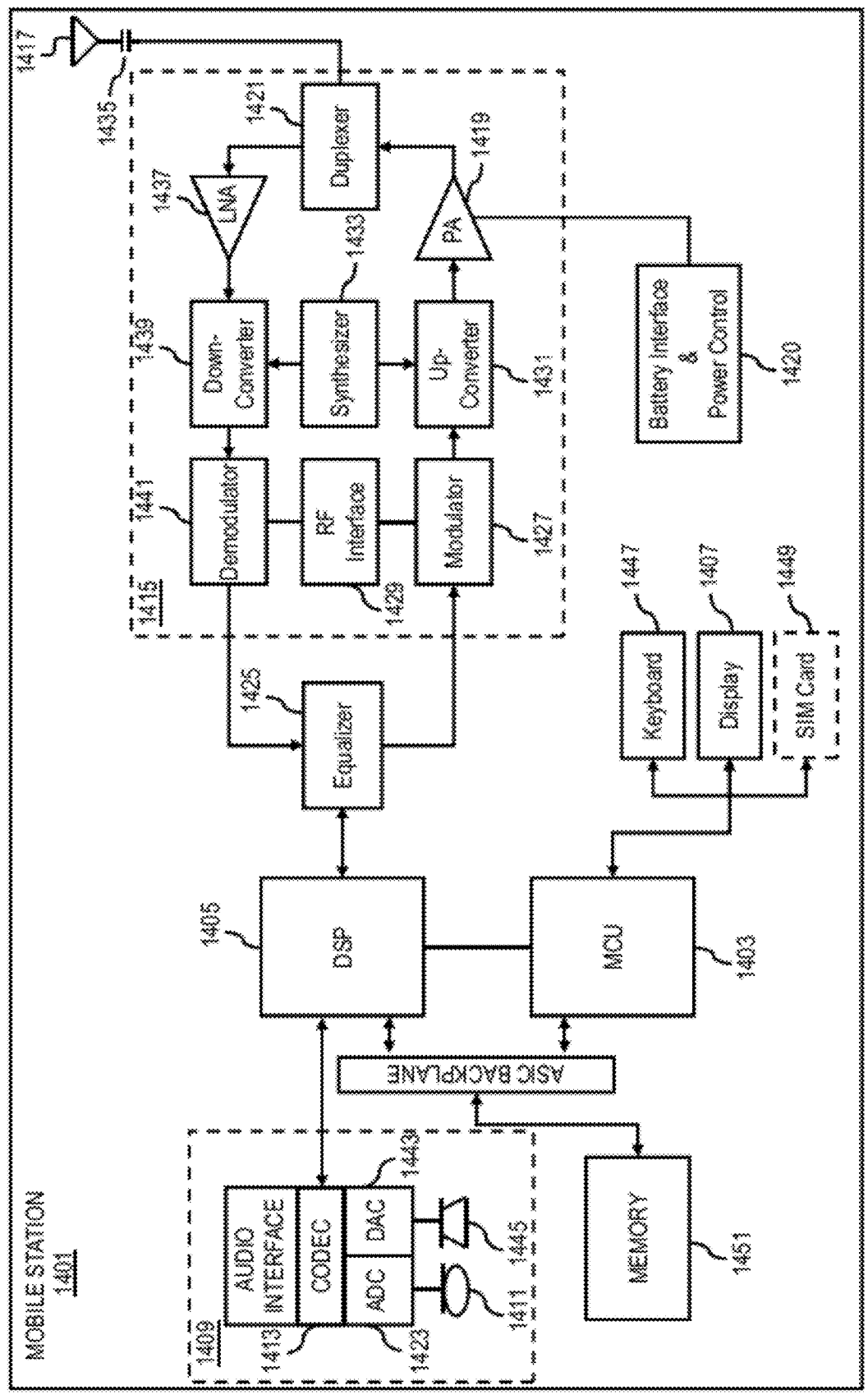
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1401, or a portion thereof, constitutes a means for performing one or more steps of providing privacy in cognitive radio information sharing. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of providing privacy in cognitive radio information sharing. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to provide privacy in cognitive radio information sharing. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   a request, from a device, for performing one or more operations on cognitive radio information stored in at least one distributed information space including different namespaces;
   one or more privacy policies associated with the device, the one or more operations, the cognitive radio information, the at least one distributed information space, or a combination thereof; and
   a processing, by at least one processor, of the one or more privacy policies to determine an availability, a restriction, or a combination thereof of the cognitive radio information,
   wherein the performing of the one or more operations is based, at least in part, on the availability, the restriction, or a combination thereof of the cognitive radio information.

2. A method of claim 1, wherein the (1) data and/or (2) information and/or (3) at least one signal are further based, at least in part, on the following:
   a processing of the one or more privacy policies to determine one or more anonymization processes, one or more encryption processes, one or more filtering processes, or a combination thereof,
   wherein the availability, the restriction, or a combination thereof of the cognitive radio information is further based, at least in part, on the one or more anonymization processes, the one or more encryption process, the one or more filtering processes, or a combination thereof.

3. A method of claim 1, wherein the (1) data and/or (2) information and/or (3) at least one signal are further based, at least in part, on the following:
   a processing of the one or more privacy policies to determine one or more capabilities of the device, one or more other devices sharing the cognitive radio information, or a combination thereof,
   wherein the performing of the one or more operations is further, based at least in part, on the one or more capabilities.

4. A method of claim 3, wherein the (1) data and/or (2) information and/or (3) at least one signal are further based, at least in part, on the following:
   social networking information associated with the device, the one or more other devices, or a combination thereof,
   wherein the availability, the restriction, or a combination thereof of the cognitive radio information is further based, at least in part, on the social networking information.

5. A method of claim 3, wherein the one or more operations are sniffed, interrogated, agreed, or a combination thereof among the device, the one or more other devices, or a combination thereof.

6. A method of claim 3, wherein the (1) data and/or (2) information and/or (3) at least one signal are further based, at least in part, on the following:
   a designation of one or more zones among the device, the one or more other devices, or a combination thereof,
   wherein the one or more privacy policies, the availability, the restriction, or a combination thereof of the cognitive radio information, or a combination thereof is based, at least in part, on the one or more zones.

7. A method of claim 6, wherein the (1) data and/or (2) information and/or (3) at least one signal are further based, at least in part, on the following:
   one or more cognitive radio parameters associated with the device, the one or more other devices, or a combination thereof,
   wherein the one or more zones are based, at least in part, on the one or more cognitive radio parameters.

8. A method of claim 1, wherein the (1) data and/or (2) information and/or (3) at least one signal are further based, at least in part, on the following:
   a signing of the one or more operations, the cognitive radio information, or a combination thereof based, at least in part, on the one or more privacy policies,
   wherein the performing of the one or more operations is based, at least in part, on the signing.

9. A method of claim 1, wherein the (1) data and/or (2) information and/or (3) at least one signal are further based, at least in part, on the following:
   a restriction of access to at least a portion of the cognitive radio information associated with the device.

10. A method of claim 1, wherein the (1) data and/or (2) information and/or (3) at least one signal are further based, at least in part, on the following:
    at least one determination of the one or more privacy policies from one or more local privacy stores, one or more remote privacy stores, or a combination thereof.

11. An apparatus comprising:
    at least one processor; and
    at least one memory including computer program code for one or more programs,
    the at least one memory and the computer program code configured to, with the at least one processor, cause the apparatus to perform at least the following,
    receive a request, from a device, for performing one or more operations on cognitive radio information stored in at least one distributed information space including different namespaces;
    determine one or more privacy policies associated with the device, the one or more operations, the cognitive radio information, the at least one distributed information space, or a combination thereof;
    process and/or facilitate a processing of the one or more privacy policies to determine an availability, a restriction, or a combination thereof of the cognitive radio information; and
    cause, at least in part, the performing of the one or more operations based, at least in part, on the availability, the restriction, or a combination thereof of the cognitive radio information.

12. An apparatus of claim 11, wherein the apparatus is further caused to:
    process and/or facilitate a processing of the one or more privacy policies to determine one or more anonymization processes, one or more encryption processes, one or more filtering processes, or a combination thereof,
    wherein the availability, a restriction, or a combination thereof of the cognitive radio information is further based, at least in part, on the one or more anonymization processes, the one or more encryption process, the one or more filtering processes, or a combination thereof.

13. An apparatus of claim 11, wherein the apparatus is further caused to:
    process and/or facilitate a processing of the one or more privacy policies to determine one or more capabilities of the device, one or more other devices sharing the cognitive radio information, or a combination thereof,
wherein the performing of the one or more operations is further, based at least in part, on the one or more capabilities.

14. An apparatus of claim 13, wherein the apparatus is further caused to:
determine social networking information associated with the device, the one or more other devices, or a combination thereof,
wherein the availability, a restriction, or a combination thereof of the cognitive radio information is further based, at least in part, on the social networking information.

15. An apparatus of claim 13, wherein the one or more operations are sniffed, interrogated, agreed, or a combination thereof among the device, the one or more other devices, or a combination thereof.

16. An apparatus of claim 13, wherein the apparatus is further caused to:
cause, at least in part, a designation of one or more zones among the device, the one or more other devices, or a combination thereof,
wherein the one or more privacy policies, the availability, the restriction, or a combination thereof of the cognitive radio information, or a combination thereof is based, at least in part, on the one or more zones.

17. An apparatus of claim 16, wherein the apparatus is further caused to:
determine one or more cognitive radio parameters associated with the device, the one or more other devices, or a combination thereof,
wherein the one or more zones are based, at least in part, on the one or more cognitive radio parameters.

18. An apparatus of claim 11, wherein the apparatus is further caused to:
cause, at least in part, a signing of the one or more operations, the cognitive radio information, or a combination thereof based, at least in part, on the one or more privacy policies,
wherein the performing of the one or more operations is based, at least in part, on the signing.

19. An apparatus of claim 11, wherein the apparatus is further caused to:
cause, at least in part, a restriction of access to at least a portion of the cognitive radio information associated with the device.

20. An apparatus of claim 11, wherein the apparatus is further caused to:
determine the one or more privacy policies from one or more local privacy stores, one or more remote privacy stores, or a combination thereof.

* * * * *